(12) United States Patent
Hainberger et al.

(10) Patent No.: US 6,856,453 B2
(45) Date of Patent: Feb. 15, 2005

(54) CONTROL SCHEME FOR LONG WAVELENGTH CHANNELS IN WIDEBAND WDM OPTICAL FIBER TRANSMISSION SYSTEM

(75) Inventors: Rainer Hainberger, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 10/610,527

(22) Filed: Jul. 2, 2003

(65) Prior Publication Data

US 2004/0004756 A1 Jan. 8, 2004

Related U.S. Application Data

(63) Continuation of application No. PCT/JP01/00027, filed on Jan. 5, 2001.

(51) Int. Cl.[7] .............................................. H01S 3/00
(52) U.S. Cl. ..................................... 359/334; 359/341.3
(58) Field of Search ............................... 359/334, 341.3

(56) References Cited

U.S. PATENT DOCUMENTS

| | | | |
|---|---|---|---|
| 6,052,219 A | | 4/2000 | Kidorf et al. |
| 6,459,529 B1 | * | 10/2002 | Grubb et al. .............. 359/341.3 |
| 6,510,000 B1 | * | 1/2003 | Onaka et al. .............. 359/334 |
| 6,624,926 B1 | * | 9/2003 | Hayashi et al. .............. 359/334 |
| 6,654,162 B2 | * | 11/2003 | Akasaka et al. .............. 359/334 |

FOREIGN PATENT DOCUMENTS

| | | |
|---|---|---|
| EP | 1 018 666 A1 | 7/2000 |
| EP | 1 076 434 A2 | 2/2001 |
| EP | 1 094 624 A2 | 4/2001 |
| WO | 00/49721 A3 | 8/2000 |

OTHER PUBLICATIONS

Yano et al., "Experimental Study onf SRS Loss and Its Compensation in Three–Band WDM Transmission" (with translation).

Kani et al., "Novel 1470–nm–Band WDM Transmission and Its Application to Ultra–Wide–Band WDM Transmission", pp. 1131–1140.

* cited by examiner

*Primary Examiner*—Mark Hellner
(74) *Attorney, Agent, or Firm*—Staas & Halsey LLP

(57) ABSTRACT

There is provided in an optical amplifier device used for a system in which a power transfer takes place from comparatively short wavelength signal to a comparatively long wavelength signal. The device includes an amplifier stage coupled to an optical transmission medium, a monitor monitoring a status of a first band; and a pump light source unit supplying at least one first pump light to the optical transmission medium on the basis of the status of the first band monitored, so that the above at least one first pump light supplies additional power to longer wavelength channels related to the status of the first band.

29 Claims, 22 Drawing Sheets

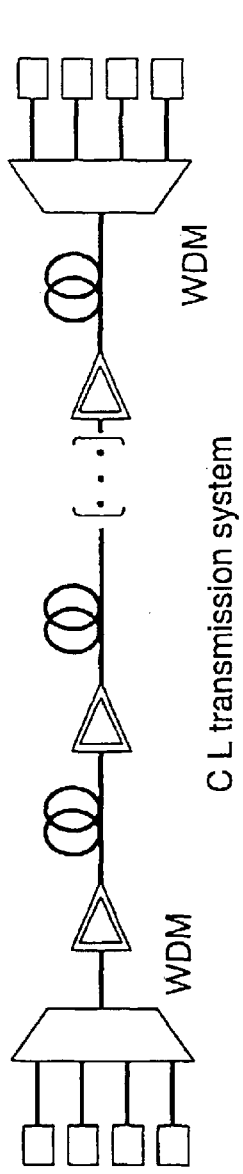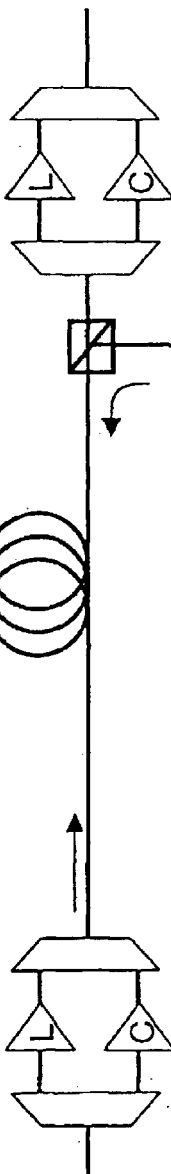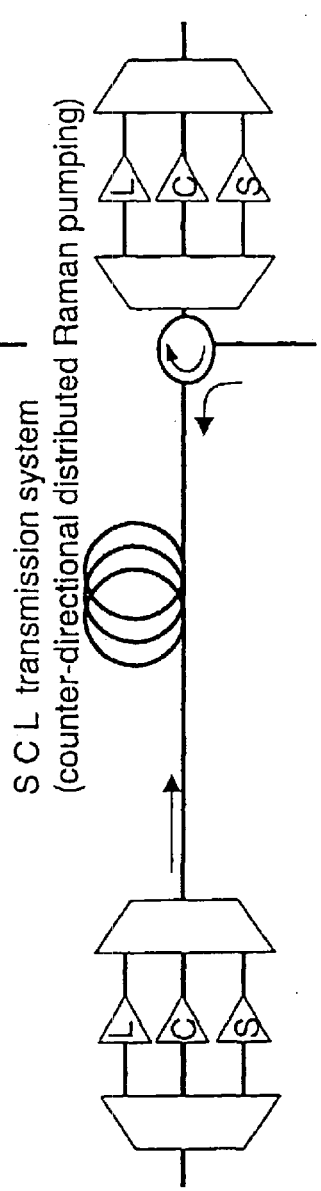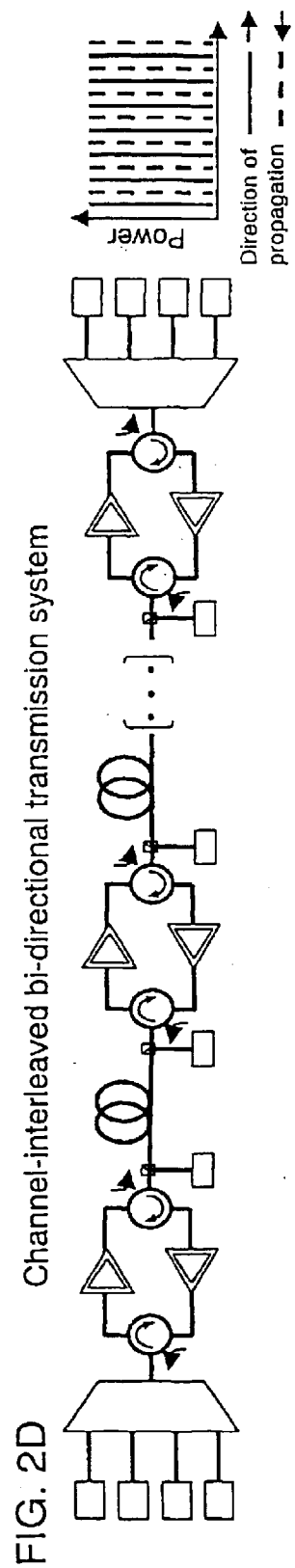
FIG. 2A
FIG. 2B  C L transmission system (counter-directional distributed Raman pumping)
FIG. 2C  S C L transmission system (counter-directional distributed Raman pumping)
FIG. 2D  Channel-interleaved bi-directional transmission system

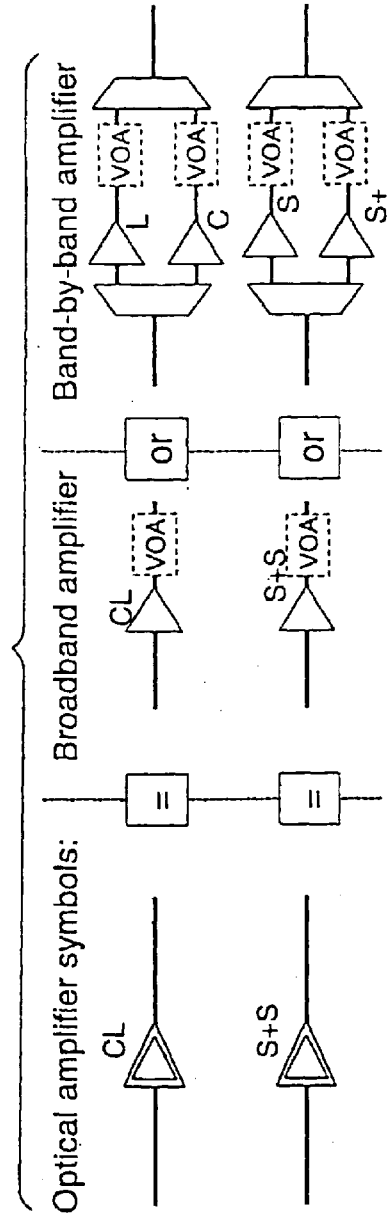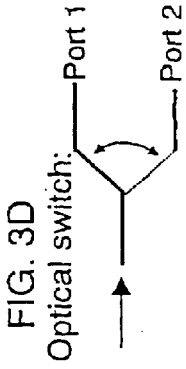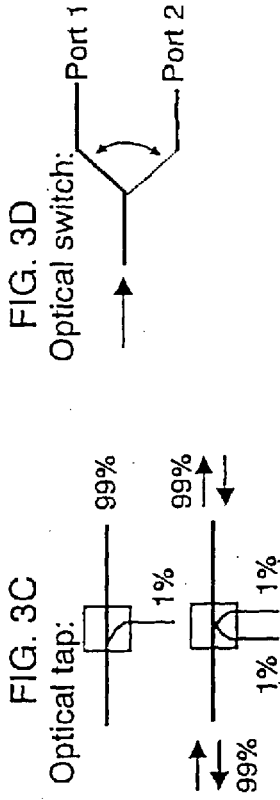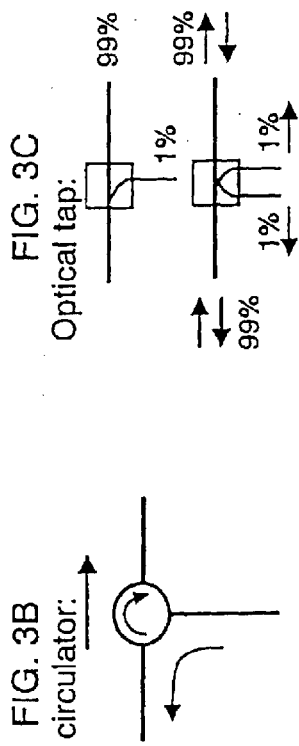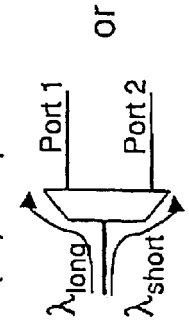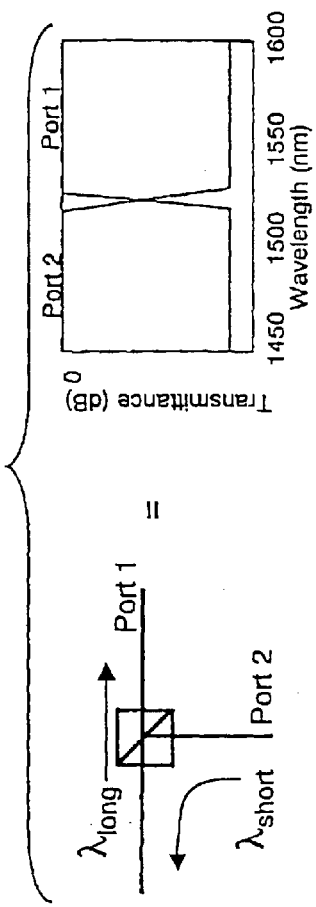

FIG. 4
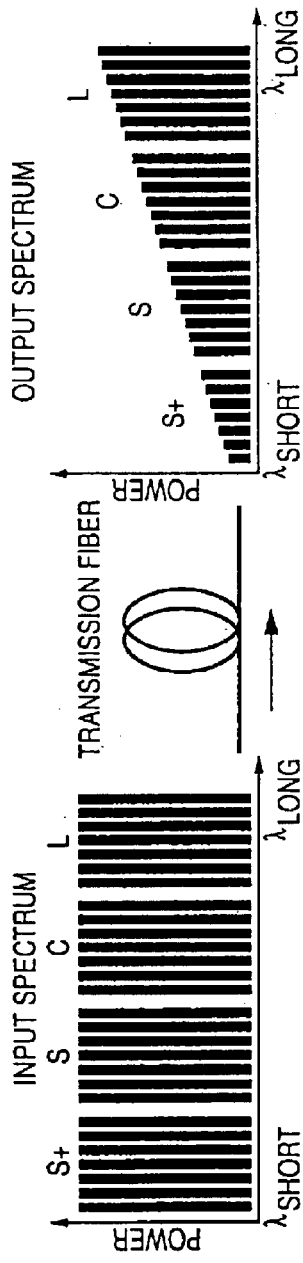
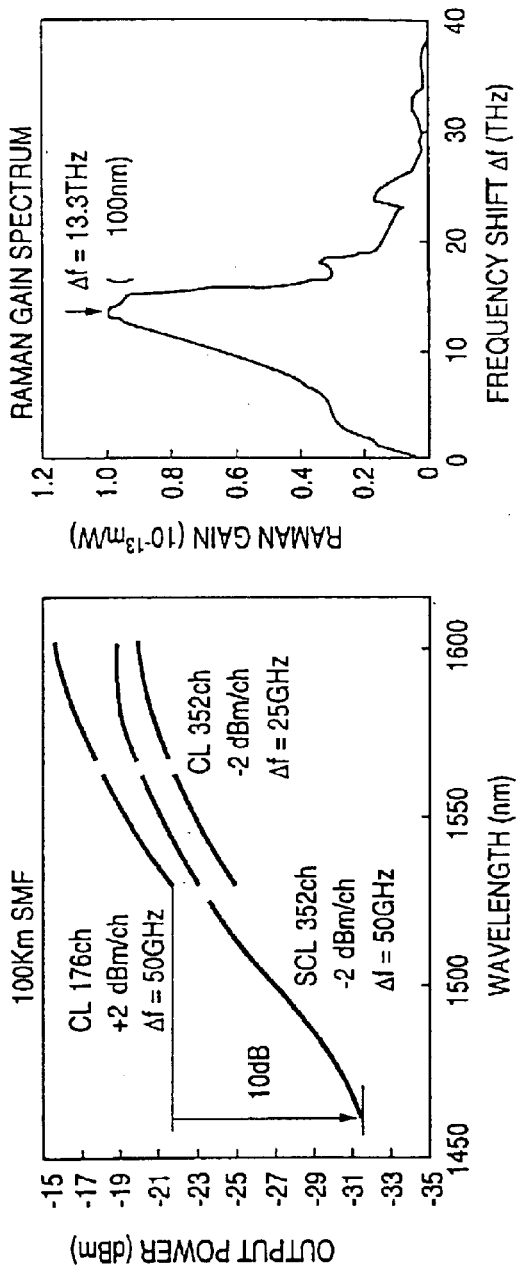

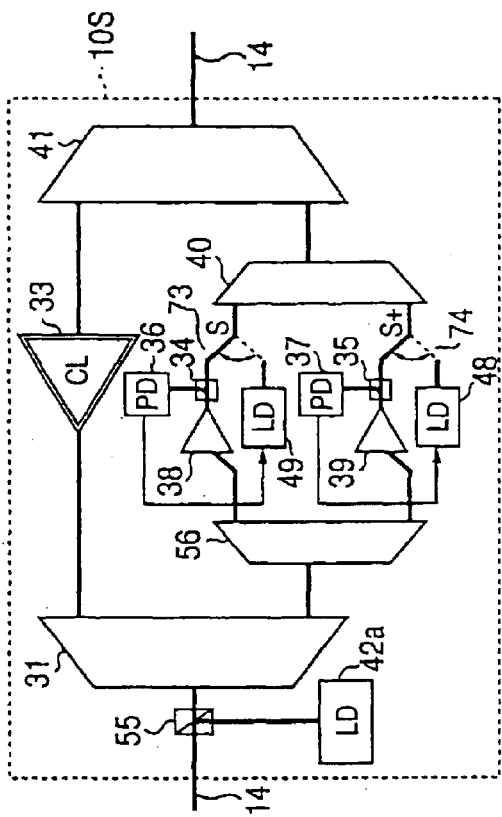
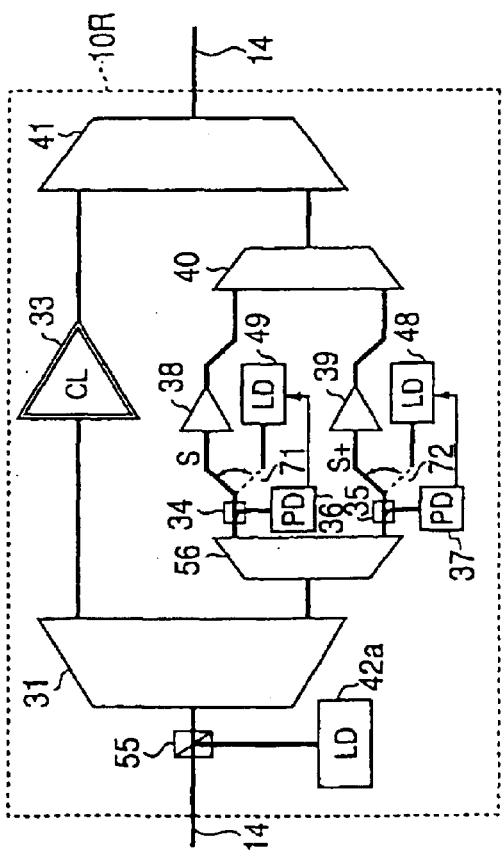

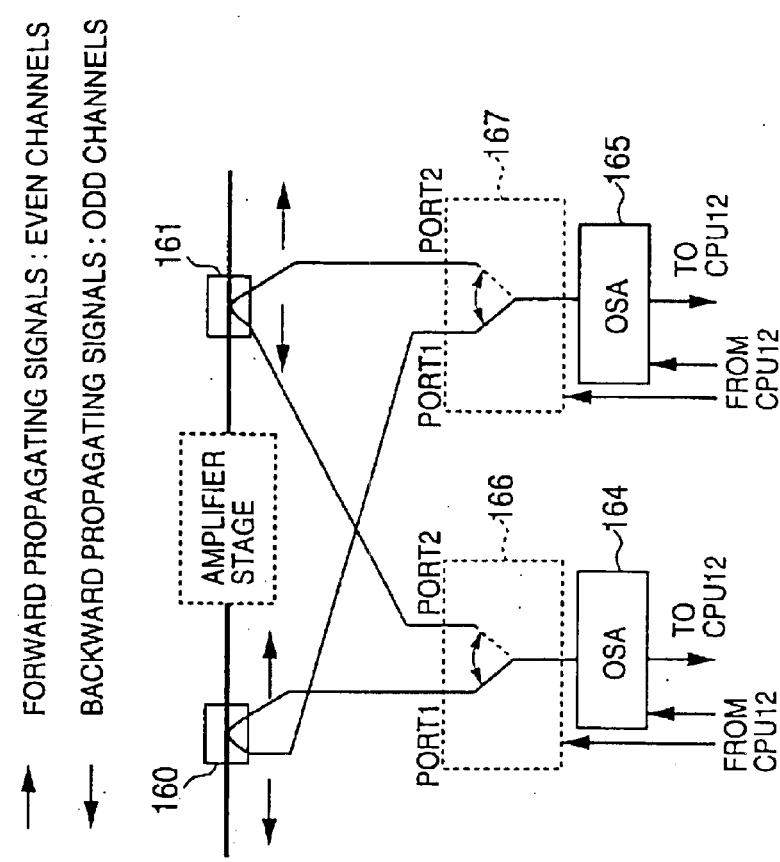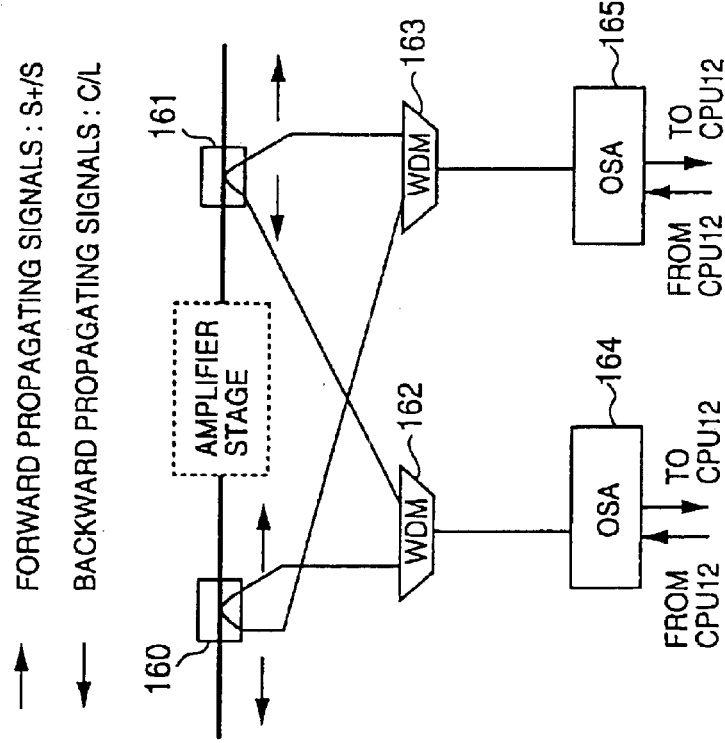

CONTROL SCHEME FOR LONG WAVELENGTH CHANNELS IN WIDEBAND WDM OPTICAL FIBER TRANSMISSION SYSTEM

This application is a continuing application, filed under 35 U.S.C. §111(a), of International Application PCT/JP01/00027, filed Jan. 5, 2001. The present patent application was published in the International Search Report in English.

TECHNICAL FIELD

The present invention relates to wide-band WDM (Wave Division Multiplexing) transmission systems and a protection scheme for the long wavelength channels in such systems against failure in the absence of the short wavelength signals.

BACKGROUND ART

The optical communication system of the related art comprises a transmitting terminal for generating a WDM optical signal formed by wavelength-division multiplexing of a plurality of optical signals of different wavelengths, an optical transmission line for transmitting the WDM optical signal transmitted from the transmitting terminal and a receiving terminal for receiving the transmitted WDM optical signal. Moreover, this optical communication system comprises, as required, one or a plurality of optical repeaters having the function to amplify the WDM optical signal in the course of the optical transmission line.

In such an optical communication system, the waveform of each optical signal is deteriorated due to non-linear optical effects in the optical transmission line. In order to eliminate the deterioration of the waveform, it is effective to reduce the optical power of the optical signals launched into the transmission line, but a reduction of the optical power results in an increase of the optical signal to noise ratio (OSNR) due to noise accumulation in the optical amplifiers.

For this purpose, it has been proposed to use a combination of discrete optical amplifiers provided within repeaters and distributed optical amplifier using the optical transmission line in common as the optical amplifying medium. In a discrete optical amplifier the amplifying medium and pump light source are centralized in one area. In contrast, the amplifying medium of a distributed optical amplifier is laid between two remote places and pump light source is provided in one or both places.

Fiber doped optical amplifiers represent one group of optical fiber amplifiers. In doped fiber amplifiers a lanthanide rare-earth element is added to the optical fiber. The structure of electronic excitation levels of lanthanide rare-earth atoms allows for amplification by stimulated emission in the low-absorption wavelength domain of optical fibers. The operation bandwidth is limited to certain wavelength ranges: Neodymium (Nd) amplifies in the 1060 nm wavelength band, Praseodymium (Pr) in the 1300 nm wavelength band, Thulium (Tm) in the 1450 nm wavelength band and Erbium (Er) in the 1550 nm band.

The other group of optical fiber amplifier takes advantage of stimulated Raman scattering (SRS) an inelastic scattering process between photons and optical phonons of lattice vibrations. It has a wide gain width and a gain shift of 13.3 THz (about 100 nm), as will be described later with reference to FIG. 4. In contrast to erbium doped fiber amplifiers, the SRS effect occurs also in ordinary optical fibers. Moreover, the pumping wavelength can be set for any amplification wavelength.

The low loss transmission window in silica-based optical fibers covers the wavelength range from 1450–1650 nm with a minimum around 1550 nm. Until recently, only Erbium doped fiber amplifiers (EDFA) which cover the so-called C-band (1530–1565 nm) and the gain-shifted EDFA which cover the so-called L-band (1570–1605 nm) were employed. In these systems the pump wavelengths for distributed Raman amplification (DRA) are much shorter than the signal wavelengths.

The increasing demand for transmission capacity of optical fiber systems requires the expansion of the optical bandwidth in a single fiber. Extension to longer wavelengths has several drawbacks. The loss profile in this wavelength domain varies strongly among installed fibers, which makes system design more difficult and materials and technologies for optical components (e.g. photodiodes) yet have to be developed. Raman amplification is in principle available for this wavelength domain. However, the pump wavelengths would partly overlap with the short wavelengths signals in the C-band.

On the short wavelength side below 1530 nm, the low loss region of silica-based fibers extends to 1450 nm. Raman pump wavelengths for this region do not overlap with signals; however, they are located at the water-peak of optical fibers, where the absorption loss is high. Nevertheless, due to the availability of high-power pump lasers, Raman amplification is a feasible technology for this wavelength domain. Besides, Thulium doped amplifiers and gain-shifted Thulium doped amplifiers are candidates as amplifiers for wavelength bands below 1530 nm. The additional wavelength regions are referred to as S+ band (1450–1490 nm) and S band (1490–1530 nm). In these new wide-bandwidth systems, the short wavelength signals act as DRA pump light with respect to the long wavelength signals. S+ and S band wavelengths transfer optical power to the C and L band channels via SRS. Distributed Raman pumping of the S+ and S band channels compensates the power depletion due to SRS as well as the increased fiber loss at S+ and S wavelengths. If all wavelengths are in service, the power transfer is balanced.

A further description will be given of the conventional optical communication system with reference to the accompanying drawings.

FIG. 1 is a graph of a typical optical loss spectrum of silica-based optical fibers in which the low loss region covers the wavelength range from 1450 to 1650 nm. Optical amplifiers allow simultaneous amplification of a group of wavelengths. The C and L band correspond to the wavelength ranges of Erbium doped and the gain-shifted Erbium doped amplifiers. The S+ and S band are related to the wavelength ranges of Thulium doped and gain-shifted Thulium doped fiber amplifiers. When light of 1450 nm and 1550 nm travels 100 km through an optical fiber with a loss of 0.26 dB/km, it experiences a loss of 26 dB and 20 dB, respectively. Thus, light with a wavelength of 1450 nm experiences a loss of about 0.06 dB/km higher than the lowest loss wavelength.

FIG. 2A shows a conventional WDM transmission system. Symbols of optical components in the accompanying drawings including FIG. 2A are defined as shown in FIGS. 3A through 3F. FIG. 3A shows various types of optical amplifiers. The C and L band can be amplified either separately by means of a broadband C/L band amplifier. Accordingly, S and S+ bands can be amplified either by separate doped fiber amplifiers or Raman amplifiers, or by amplifiers covering the whole S+ and S band wavelength range. For this group of amplifiers a double lined triangle is used in this specification. Variable optical attenuators (VOA) can be added to the amplifiers as means for adjusting the amplifier output power.

FIG. 3B shows an optical circulator, and FIG. 3C shows an optical tap. FIG. 3D shows an optical switch. FIGS. 3E and 3F show a WDM coupler.

Turning to FIG. 2A again, the WDM transmission system includes a transmitter, a transmission fiber connecting remote locations, discrete optical amplifier to compensate for the fiber loss, and a receiver. Multiple wavelengths transmission enhances the transmission capacity. The optical amplifiers add noise in the form of amplified spontaneous emission, which reduces the optical signal-to-noise ratio, thus giving rise to errors in the signal detection. Distributed Raman amplification can improve the signal to noise ratio because it amplifies the signals along the transmission fiber. Moreover, the stimulated Raman scattering tilt, which will be described later in detail, can be compensated for in the system. There are control schemes that allow adjusting the spectral tilt under changing conditions of C and L band channel usage (OECC'99, "Optical SNR degradation due to stimulated Raman scattering in dual-band WDM transmission systems and its compensation by optical level management", T. Hoshida, T. Terahara, J. Kumasako and H. Onaka).

Distributed Raman amplification generally is not high enough to make discrete amplifiers obsolete. As shown in FIG. 2B, counter-propagating amplification is used to average out bit-pattern dependent amplification causing power fluctuations. Commercial systems employ C and L band amplifiers. In the laboratory triple band (S, C, L) transmission has been demonstrated (ECOC2000, "Experimental Study on SRS loss and its compensation in three-band WDM transmission", Yutaka Yano, Tadashi Kasamatsu, Yoshitaka Yokoyama and Takashi Ono), as shown in FIG. 2C.

In dense WDM systems, channel-interleaved bi-directional transmission as shown in FIG. 2D can reduce impairments due to nonlinear interaction between adjacent channels (cross phase modulation, four wave mixing) and thus allows increasing the spectral efficiency of the system. At the amplifier stage, optical circulators (directional coupling elements) separate forward and backward propagating channels.

FIG. 4 shows the optical power depletion due to stimulated Raman scattering and fiber loss. In wide-band WDM transmission systems with high channel count, SRS causes a strong power transfer from the short wavelengths to long wavelengths. The Raman gain depends on the frequency shift between the shorter and the longer wavelength. It has a maximum around 13.3 THz in silica-based fibers. Thus, for distributed Raman pumping it is most effective to allocate the pump wavelength shifted about 100 nm to shorter wavelength with respect to the signal wavelengths. In wide band WDM systems the short wavelength signals become efficient pump light sources for the long wavelength channels.

FIG. 5 shows SRS-spectral tilt compensation using DRA and pre-emphasis (repeater output level control). Using pre-emphasis and distributed Raman amplification of the short wavelength channels, the higher absorption loss and the SRS power depletion can be compensated (ECOC2000, "Experimental Study on SRS loss and its compensation in three-band WDM transmission", Yutaka Yano, Tadashi Kasamatsu, Yoshitaka Yokoyama and Takashi Ono). It is to be noted that the power transfer is balanced if all channels are on.

However, in wide-bandwidth systems, an interruption of the operation of the short wavelength channels (either by failure or for the purpose of maintenance) or a reduced number of active short wavelength channels result in less or no power transfer to the C and L band signals. As a consequence, the C and L band signal output power drops and the OSNR degrades, making these channels more error-prone.

Thus, a general object of the present invention is to provide a control scheme for long wavelength channels in wideband WDM optical fiber transmission system in which the above problem is overcome.

A more specific object of the present invention is to provide an optical amplifier device capable of protecting long wavelength channels of wideband optical fiber transmission systems in which the power transfer from the short to the long signal wavelengths due to stimulated Raman scattering is essential for the transmission of the long wavelength signals.

Another object of the present invention is to provide an optical communication system utilizing the above protection scheme.

DISCLOSURE OF THE INVENTION

The above objects of the present invention are achieved by an optical amplifier device used for a system in which a power transfer takes place from comparatively short wavelength signal to a comparatively long wavelength signal, the optical amplifier device comprising: an amplifier stage coupled to an optical transmission medium; a monitor monitoring a status of a first band; and a pump light source unit supplying at least one first pump light to the optical transmission medium on the basis of the status of the first band monitored, so that the above at least one first pump light supplies additional power to longer wavelength channels related to the status of the first band.

The above objects of the present invention are also achieved by an optical amplifier device used for a bi-directional system in which a power transfer takes place from comparatively short wavelength signal to a comparatively long wavelength signal, the optical amplifier device comprising: first and second amplifier systems; and directional coupling elements coupling the first and second amplifier stages to an optical transmission medium. Each of the first and second amplifier systems comprises: an amplifier stage coupled to the optical transmission medium; a monitor monitoring a status of a first band; and a pump light source unit supplying at least one first pump light to the optical transmission medium on the basis of the status of the first band monitored, so that the above at least one first pump light supplies additional power to longer wavelength channels related to the status of the first band.

The above objects of the present invention are also achieved by a method of controlling an optical amplifier device, comprising the steps of: monitoring a status of a first band; and supplying at least one first pump light to an optical transmission medium on the basis of the status of the first band monitored, so that the first pump light supplies additional power to longer wavelength channels related to the status of the first band.

The above objects of the present invention are also achieved by an optical transmission system comprising: optical amplifier devices; and an optical transmission medium coupling the optical amplifier devices. One of the optical amplifier devices comprises: an amplifier stage coupled to the optical transmission medium; a monitor monitoring a status of a first band; and a pump light source unit supplying at least one first pump light to the optical transmission medium on the basis of the status of the first band monitored, so that the above at least one first pump light supplies additional power to longer wavelength channels related to the status of the first band.

The above objects of the present invention are achieved by a bi-directional optical transmission system in which a power transfer takes place from comparatively short wavelength signal to a comparatively long wavelength signal, the bi-directional optical transmission system comprising: optical amplifier devices; and an optical transmission medium coupling the optical amplifier devices. One of the optical amplifier devices comprises: first and second amplifier systems; and directional coupling elements coupling the first and second amplifier stages to the optical transmission medium. Each of the first and second amplifier systems comprises: an amplifier stage coupled to the optical transmission medium; a monitor monitoring a status of a first band; and a pump light source unit supplying at least one first pump light to the optical transmission medium on the basis of the status of the first band monitored, so that the above at least one first pump light supplies additional power to longer wavelength channels related to the status of the first band.

BRIEF DESCRIPTION OF THE DRAWINGS

Other objects, features and advantages of the present invention will become more apparent from the following detailed description when read in conjunction with the accompanying drawings, in which:

FIGS. 2A through 2D are block diagrams of conventional optical communication systems;

FIGS. 3A through 3F are diagrams of symbol definitions of optical components;

FIG. 4 is a diagram showing optical power depletion due to SRS and fiber loss;

FIG. 19A is a block diagram of an optical repeater node according to an eighth embodiment of the present invention;

FIG. 19B is a block diagram of a variation of the repeater node shown in FIG. 19A;

FIGS. 25A and 25B are block diagrams of optical setups for monitoring part of the forward and the backward propagating lights by using optical spectrum analyzers.

BEST MODE FOR CARRYING OUT THE INVENTION

A description will first be given of the principle of the present invention.

According to one aspect of the present invention, additional Raman pump light sources are provided in the amplifier stages. These sources are off when the S+ and the S band are in full service. Photodiodes monitor the power levels of the S+ and S bands. Depending on the position of the photodiodes the control signal is used to switch on/off the substitute Raman pump laser diodes in the same repeater node or in the previous or next one node. The photodiodes can either be located before or behind the amplifier. Thus, it is possible to maintain a reliable C/L band transmission also without full operation of the S+ and S band channels.

Figure 6:
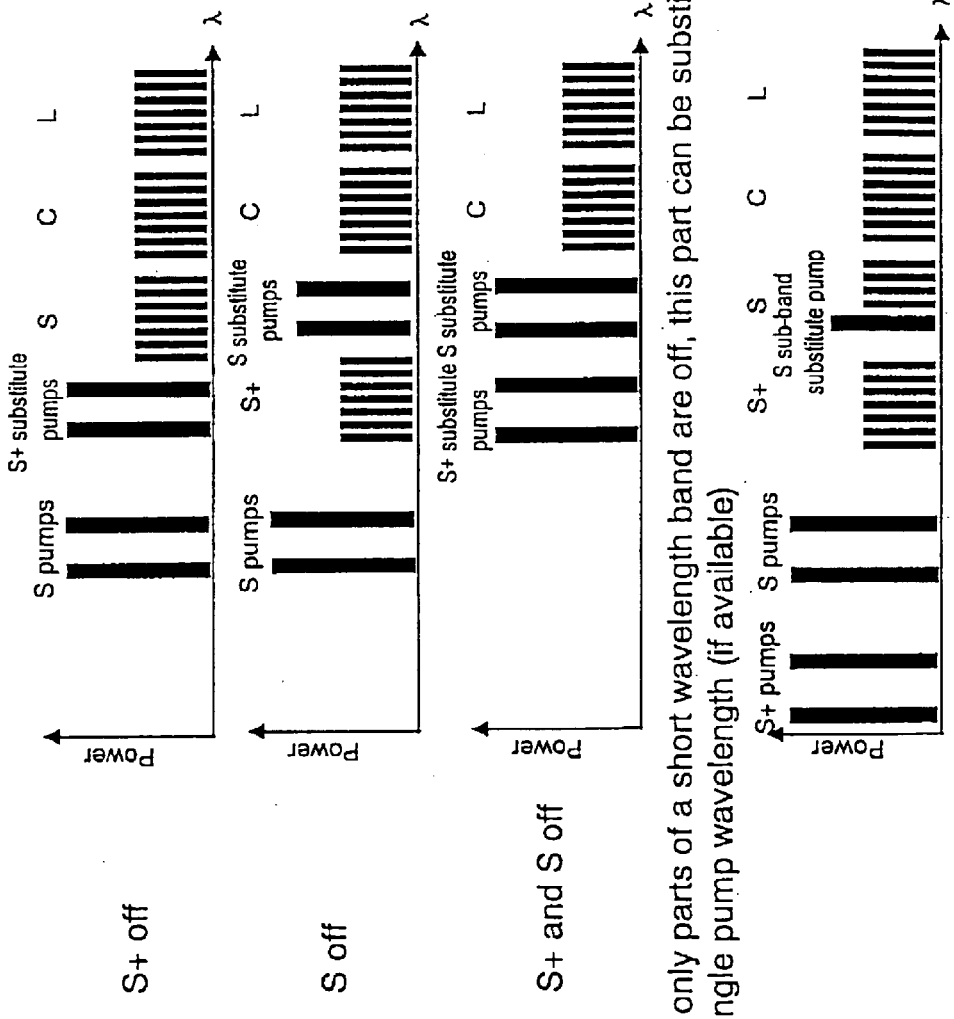
FIG. 6 is a diagram showing the principle of the present invention.

Referring to FIG. 6, in the case of the absence of all S+ and/or S band channels or parts of the channels, the power transfer from the shorter to the longer wavelengths is reduced or completely interrupted. As a consequence, the power of C and L band channels drops and the OSNR suffers, leading to a higher error probability for these channels. Therefore, a back-up system and a control mechanism are required, which provide optical pump power to the C and L band channels in the case of the absence of the S+ and/or S band or parts of these bands. In addition, an increase of the C and L band repeater output power of each amplifier stage can improve the system performance in the absence of the short wavelength bands or parts of these bands.

More particularly, if the S+ band is totally or partly off or the power level of the S+ band drops, one or more substitute pump lights of different wavelengths can be switched on so that power can be supplied to longer wavelength channels (which can be referred to as longer wavelength lights or regions), as shown in part (a) of FIG. 6. As has been described with reference to FIG. 4, for distributed Raman pumping it is most effective to allocate the pump wavelength shifted about 100 nm to shorter wavelength with respect to the signal wavelengths. Hence, the substitute pump lights most efficiently pump wavelength channels that are located 100 nm longer than the wavelengths of the substitute pump lights. Thus, pump power can be supplied to the C and L bands.

The number of substitute pump lights and the wavelength values thereof can arbitrarily be selected. Generally, more substitute pump lights, more efficiently longer wavelength channels can be pumped. Preferably, the wavelengths of the substitute pump lights are selected so as not to overlap with those of the S+ band signal channels. This is essential to the case where the substitute pump lights are switched on if the power level of the S+ band drops (not totally off). Some substitute pump lights may have the wavelengths that overlap with the S+ band signal channels in a case where the substitute pump lights are switched on only when the S+ band is totally off.

In part (a) of FIG. 6, two S+ substitute pump lights are illustrated as an example. Alternatively, a single S+ substitute pump light or three or more S+ substitute pump lights can be used.

If the S band is totally or partly off or the power level of the S band drops, one or more substitute pump lights of different wavelengths can be switched on so that power can be supplied to longer wavelength channels, as shown in part (b) of FIG. 6. The wavelengths of the substitute pump lights shown in part (b) of FIG. 6 are longer than those of the substitute pump lights shown in part (a) of FIG. 6.

If both the S+ and S bands are totally or partly off or the power levels of both the bands drop, the substitute pump lights shown in parts (a) and (b) of FIG. 6 are switched on as shown in part (c) of FIG. 6.

If a part of a short wavelength band is off, this part can be substituted with a single substitute pump wavelength, as shown in part (d) of FIG. 6. That is, channel-by-channel based control can be achieved.

In short, according to the present invention, substitute pump lights are supplied in a case where the power transfer from the shorter to longer wavelengths due to stimulated Raman scattering is not sufficient for the transmission of the longer wavelength channels. Therefore, even if a reduced number of active short wavelength channels results in less or no power transfer to the longer wavelengths such as C and L bands, the substitute pump lights of wavelengths in the shorter bands such as S+ and/or S band can be supplied to compensate for the less or no power transfer. The number of substitute pump lights or the power levels thereof can be adjusted based on the power levels of the longer wavelength bands such as C and L bands.

FIG. 7A is a block diagram of a WDM transmission system according to a first embodiment of the present invention. Optical repeater nodes 10 and 20 formed so as to include amplifier devices are coupled through an optical fiber 14, which is one of optical transmission media. The amplifier device 10 includes an amplifier stage 11, a central processing unit (CPU) 12, and an electrically erasable and programmable read only memory (EEPROM) 13. Similarly, the repeater node 20 includes an amplifier stage 16, a CPU 17, and an EEPROM 18. The amplifier stages 11 and 16 are coupled through the optical fiber 14. Signal light and pump light are propagated through the optical fiber 14. The CPUs 12 and 17 exchange control data via an optical supervisory channel 15, which is also transmitted over the optical fiber 14.

Figure 8:
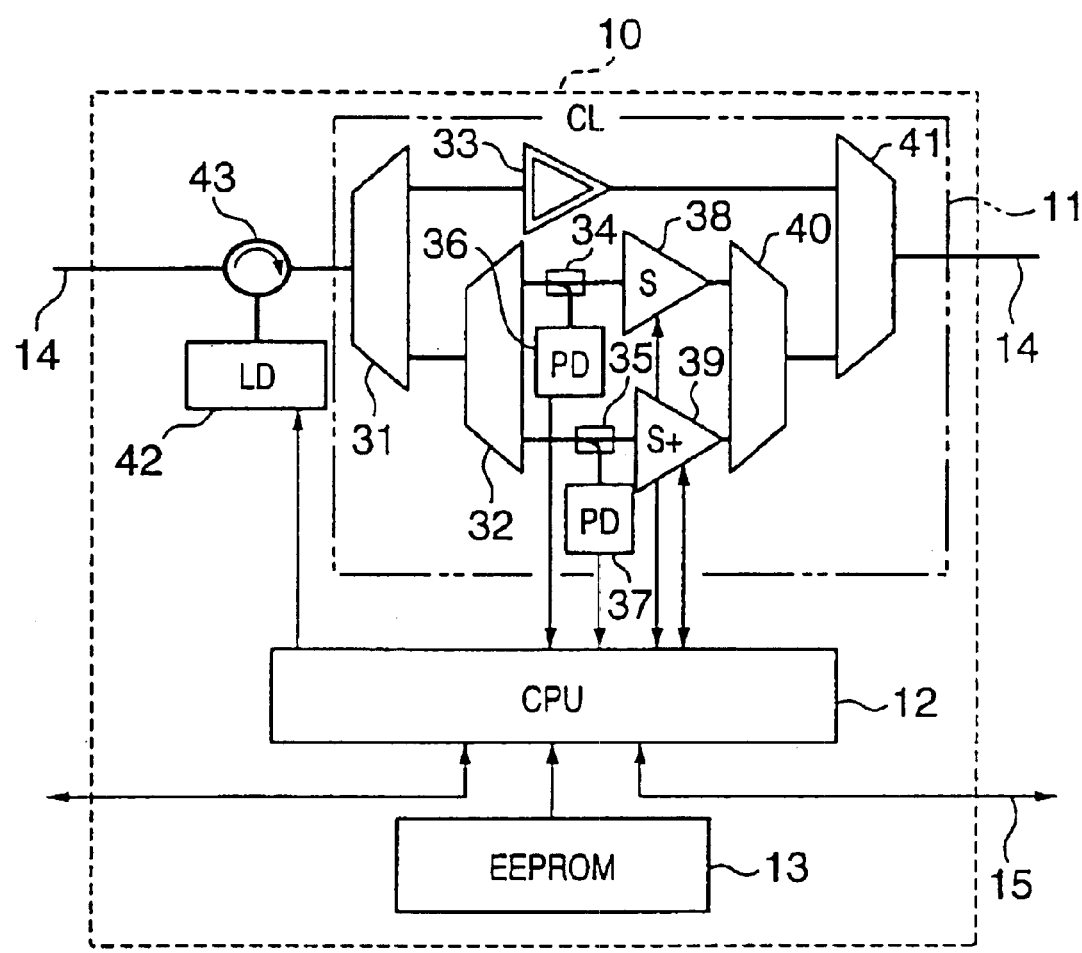
FIG. 8 is a block diagram of an optical repeater node formed of an amplifier device used in the optical transmission system shown in FIG. 7.

FIG. 8 is a block diagram of an example of the structure of the repeater node 10. The symbols of the components shown in FIG. 8 are defined in FIGS. 3A through 3F. The amplifier stage 11 is made up of WDM couplers 31 and 32, a C/L optical amplifier stage 33, optical taps 34 and 35, photodiodes (PD) 36 and 37, optical amplifiers 38 and 39, and WDM optical couplers 40 and 41. An optical circulator 43 is provided in the optical transmission line 14. A Raman pump light source unit (LD) 42, which is controlled by the CPU 12, is coupled to the optical circulator 43. The Raman pump light source unit 42 is provided in front of the WDM coupler 31. Raman pump lights emitted by the Raman pump light source unit 42 are counter-propagated with respect to signal lights.

The WDM coupler 31 demultiplexes a multiplexed signal light into signals in the C and L bands (C/L signals) and signals in the S+ and S bands (S+/S signals). The amplifier stage 33 amplifies the C/L signals. The repeater output powers of the amplifier stage 33 can be adjusted by the CPU 12. The WDM coupler 32 demultiplexes the S+/S signals into the S+ signal and the S signal. The amplifier 38 amplifies the S signal. The amplifier 39 amplifies the S+ signal. The monitor photodiode 36 monitors the status (level) of the whole S band by referring to a part of the S signal from the optical tap 34. The monitor 37 monitors the status (level) of the whole S+ band by referring to a part of the S+ signal from the optical tap 35. The repeater output powers of the amplifiers 38 and 39 can be adjusted by the CPU 12. The WDM coupler 40 multiplexes the amplified S and S+ signals into a multiplexed S+/S signal. The WDM coupler 41 multiplexes the amplified C/L signal and the S+/S signal into a multiplexed signal light, which is transmitted over the optical fiber 14.

Figure 9:
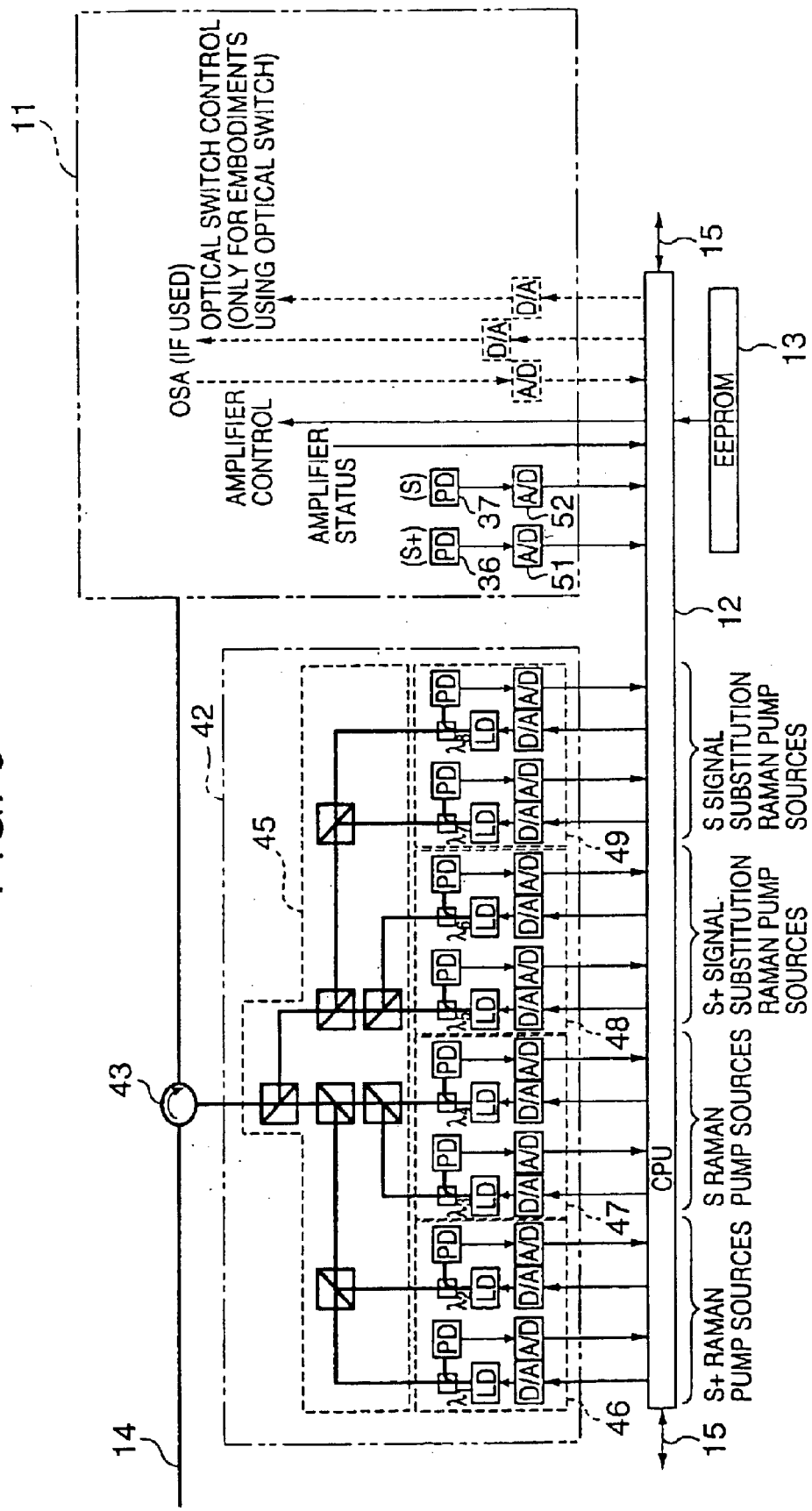
FIG. 9 is a block diagram of a Raman pump light source unit shown in FIG. 8.

The Raman pump light source unit 42 is configured as shown in FIG. 9. The Raman pump light source unit 42 includes a coupling unit 45, an S+ Raman pump light source unit 46, an S Raman pump light source unit 47, an S+ signal substitution (additional) Raman pump light source unit 48, and an S signal substitution Raman pump light source unit 49. The S+ Raman pump light source unit 46 generates S+ band pumping lights of wavelengths $\lambda 1$ and $\lambda 2$ for pumping the S+ band (see FIG. 5). The unit 46 includes a laser diode LD emitting the pump light of $\lambda 1$, and another laser diode LD emitting the pump light of $\lambda 2$. These laser diodes are controlled by the CPU 12 via digital-to-analog (D/A) converters. The levels of the pumping lights are monitored by photodiodes via optical taps, and are supplied to the CPU 12 via analog-to-digital (A/D) converters.

Figure 1:
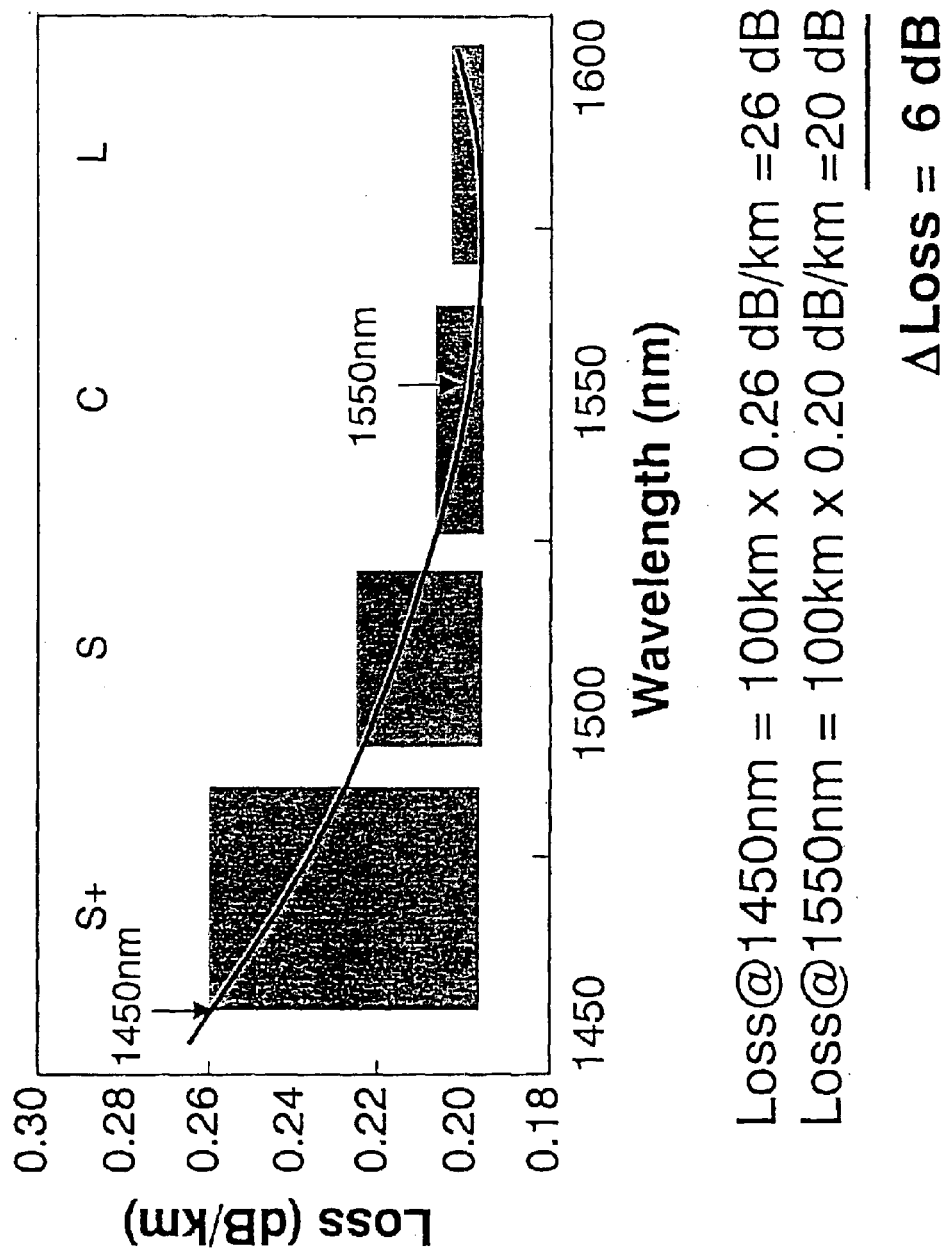
FIG. 1 is a graph showing typical fiber loss in the 1450–1600 nm wavelength domain of silica-based single mode fibers.
Figure 5:
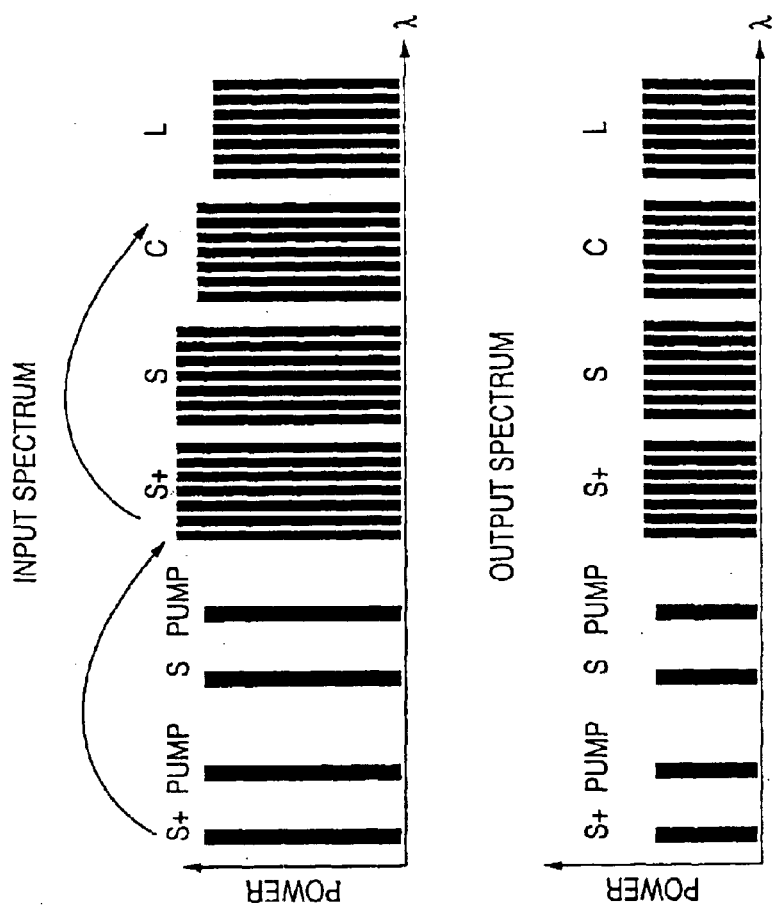
FIG. 5 is a diagram showing SRS-spectral tilt compensation using DRA and pre-emphasis.

The S Raman pump light source unit 47 emits S band pumping lights of wavelengths $\lambda 3$ and $\lambda 4$ for pumping the S band (see FIG. 5). The unit 47 has the same structure as the unit 46.

The S+ and S signal substitution Raman pump light source units 48 and 49 are newly provided according to the first embodiment of the present invention. The unit 48 generates two substitute pump lights of wavelengths λ5 and λ6 in the region between the S band Raman pump wavelengths and the S band signal wavelengths. The unit 48 has the same structure as the units 46 and 47. The unit 49 generates two substitute pump lights of wavelengths λ7 and λ8 in the region between the S band Raman pump wavelengths and the S band signal wavelengths. The unit 49 has the same structure as the units 46–8.

The coupler 45 includes seven WDM couplers, and multiplexes the eight Raman pump lights of λ1 through λ8. The multiplexed Raman pump light is applied to the circulator 43, which allows it to be propagated through the optical fiber 14 in the direction opposite to the direction in which signal light is propagated therethrough (counter-propagating). That is, the multiplexed pump light thus generated is applied to the signal light coming from the previous repeater node (not shown in FIG. 9). The circulator 43 is capable of coupling the multiplexed Raman pump light into the optical fiber 14 even if they are spectrally overlapping with the S+/S signal wavelengths.

The CPU 12 controls the pump light source units 46–49 in accordance with the levels of the S+ and S bands respectively monitored by the photodiodes 36 and 37. The output signals of the photodiodes 36 and 37 are applied to the CPU 12 via A/D converters 51 and 52. Further, the CPU 12 receives information concerning the status of the amplifiers and controls them, as will be described later. The EEPROM 13 stores programs executed by the CPU 12, and pre-set parameter values of the gains of amplifiers (or of the attenuators behind the amplifiers) and the levels of the pump light sources. The parameter settings for the Raman pump powers and the output powers of the C and L band channels for the various scenarios (S+ band off, S band off, etc.) are determined at the installation of the system.

Figure 10B:
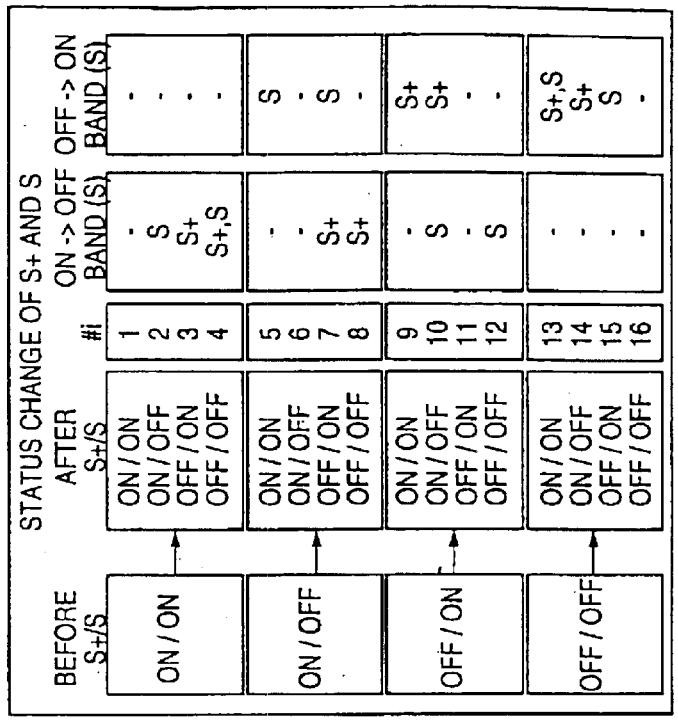
FIGS. 10A and 10B are diagrams showing a control operation of a CPU shown in FIG. 9.
Figure 10A:
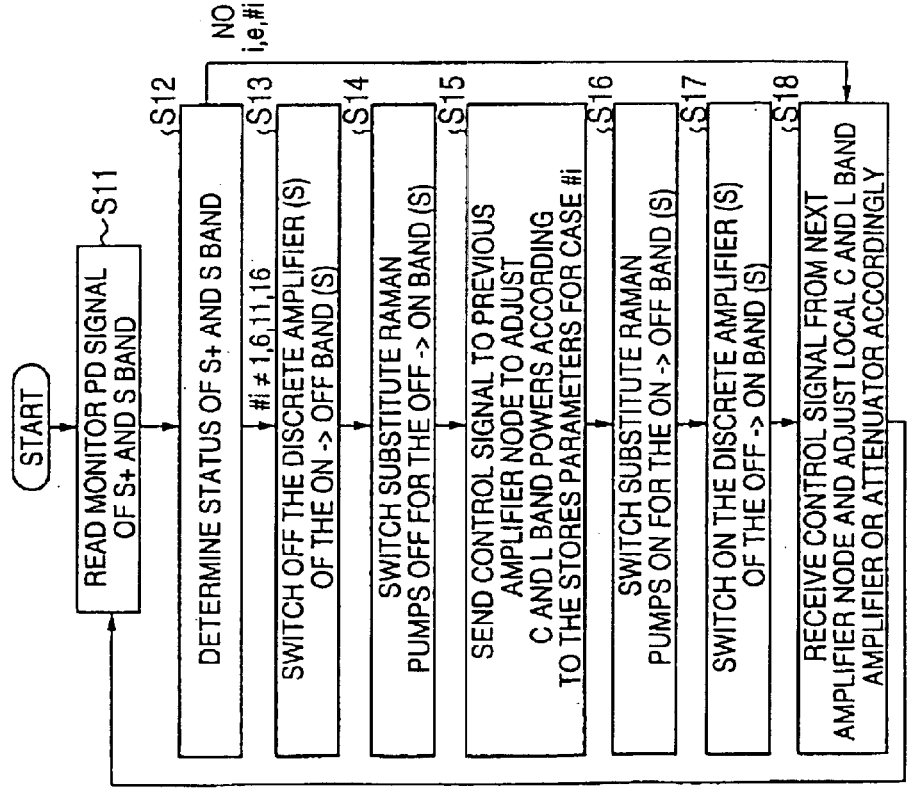

FIG. 10A is a flowchart of a control operation executed by the CPU 12, and FIG. 10B shows a table describing possible status changes of S+ and S bands. As shown in FIG. 10B, 16 status changes of the S+ and S bands are possible. Each of the status changes is identified by serial number #i. For example, for #i=1, there is no status change, and for #i=4, both the S+ and S bands change from on to off. For #i=7, the S+ band changes from on (existence of signal lights) to off (absence of signal lights) status, and the S band from off to on status. The CPU 12 switches on/off the Raman pump light source units 48 and 49 in accordance with the control sequence when a status change of the S+ and S bands takes place.

Referring to FIG. 10A, the CPU 12 reads the monitor signals of the S+ and S bands supplied from the photodiodes 36 and 37 via the A/D converters 51 and 52 (step S11). Then, the CPU 12 determines whether there is a status change of the S+ and S bands. There is no change for #i=1, 6, 11 and 16. In this case, the control sequence proceeds to step S18, which will be described later. In contrast, if a status change of the S+ and S bands occurs, the CPU 12 switches off the discrete amplifier(s) of the on-to-off band(s) (step S13). Then, the CPU 12 switches off the substitute Raman pump (s) for the off-to-on band(s) (step S14). For case of #i=7, the CPU 12 switches off the amplifier 39 shown in FIG. 8, and switches off the S signal substitution Raman pump light source unit 49. At step S13, depending on the optimum conditions determined at the installation of the system, the Raman pumps of the on-to-off bands might also be switched off.

Then, the CPU 12 sends, via the control channel 15, a control signal to the previous repeater node to adjust the C and L band powers according to the pre-set values of the parameters stored in the EEPROM 13 for case #i (step S15). The process of step S15 may be omitted, if required. The C and L band powers can be adjusted by controlling the optical amplifiers or the attenuators behind the amplifiers.

Thereafter, the CPU 12 switches on the substitute Raman pump (s) for the on-to-off band(s) (step S16), and switches on the discrete amplifier(s) of the off-to-on bands(s) (step S17). For case of #i=7, the CPU 12 switches on the S+ signal substitution Raman pump light source unit 48 shown in FIG. 8, and switches on the optical amplifier 38.

Finally, the CPU 12 receives a control signal from the next repeater node and adjusts the local C and L band amplifiers accordingly (step S18). That is, the amplifier stage 33 of the repeater node 10 shown in FIG. 8 is adjusted by the control signal sent by the repeater node 20 shown in FIG. 7. It is to be noted that regardless of status changes, the C and L band amplifiers (or the attenuators behind these amplifiers) are adjusted according to the control signal received from the next repeater node.

Figure 7:
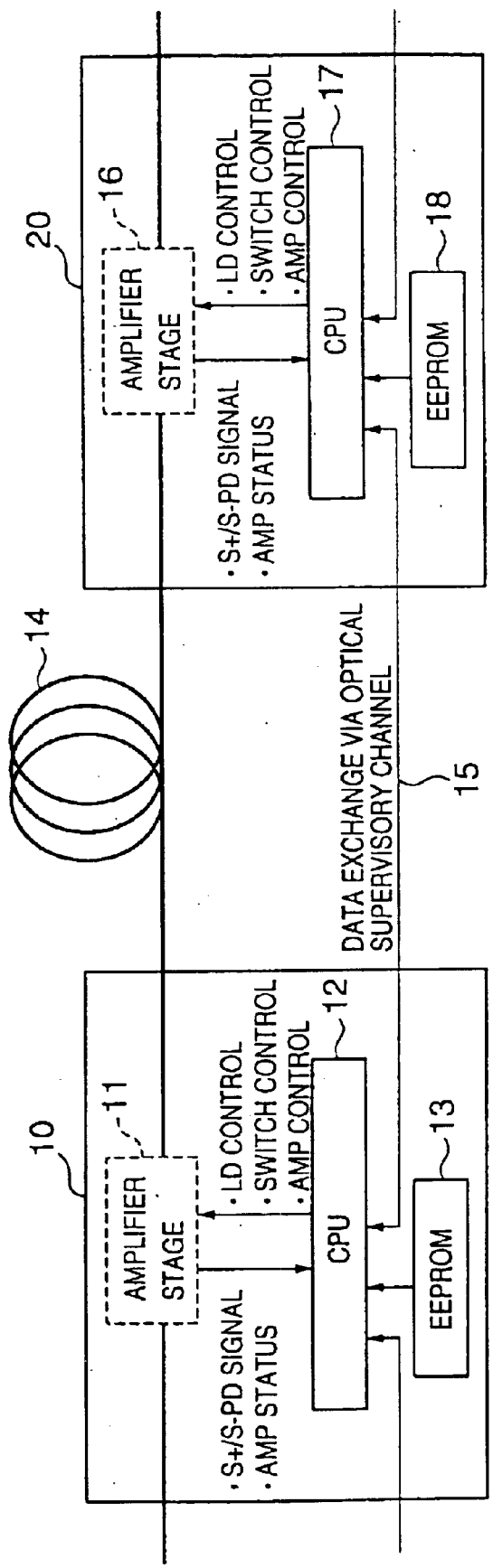
FIG. 7 is a block diagram of an optical transmission system according to a first embodiment of the present invention.

The repeater node 20 shown in FIG. 7 operates in the same manner as the repeater node 10, and therefore a description thereof will be omitted.

A description will be given of a second embodiment of the present invention.

Figure 11:
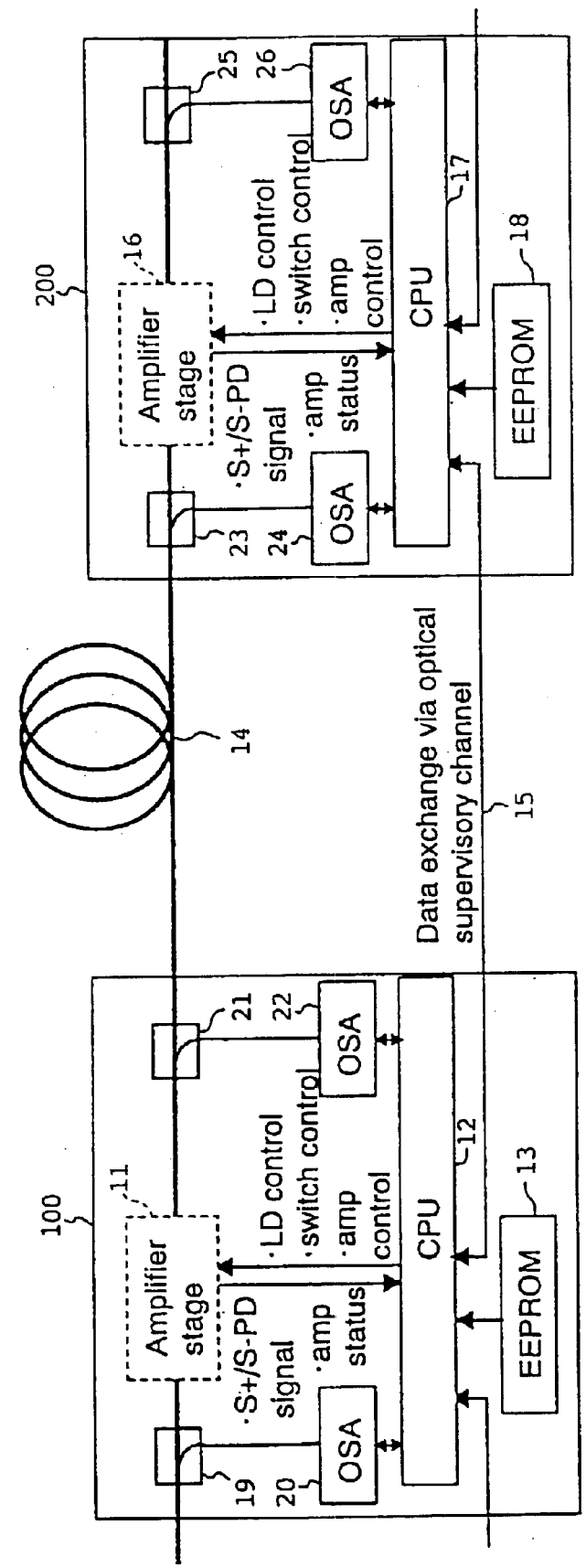
FIG. 11 is a block diagram of an optical transmission system according to a second embodiment of the present invention.

FIG. 11 is a block diagram of a WDM transmission system according to a second embodiment of the present invention. In FIG. 11, parts that are the same as those shown in FIG. 7 are given the same reference numbers. Two repeater nodes 100 and 200 employ optical spectrum analyzers (OSA) for monitoring the S+ and S bands. The advantage of the photodiodes for monitoring the S+ and S bands in the first embodiment of the present invention is that their response is much faster than the optical spectrum analyzers. In contrast, the use of the spectrum analyzers can realize finer control, as will be described later.

The repeater node 100 is equipped with optical spectrum analyzers (OSA) 20 and 22, which are coupled with the optical fiber 14 via optical taps 19 and 21, respectively. The optical spectrum analyzer 20 monitors the optical spectra of all bands at the input side of the amplifier stage 11 and supplies the spectral data to the CPU 12. The optical spectrum analyzer 22 monitors the optical spectra of all bands at the output side of the amplifier stage 11 and supplies the spectral data to the CPU 12. The amplifier stage 11 and the Raman pump light source unit 42 are configured, for example, as shown in FIG. 8.

Similarly, the repeater node 200 includes optical spectrum analyzers 24 and 26, which are respectively coupled to the input and output sides of the amplifier stage 16 via optical taps 23 and 25.

Figure 12A:
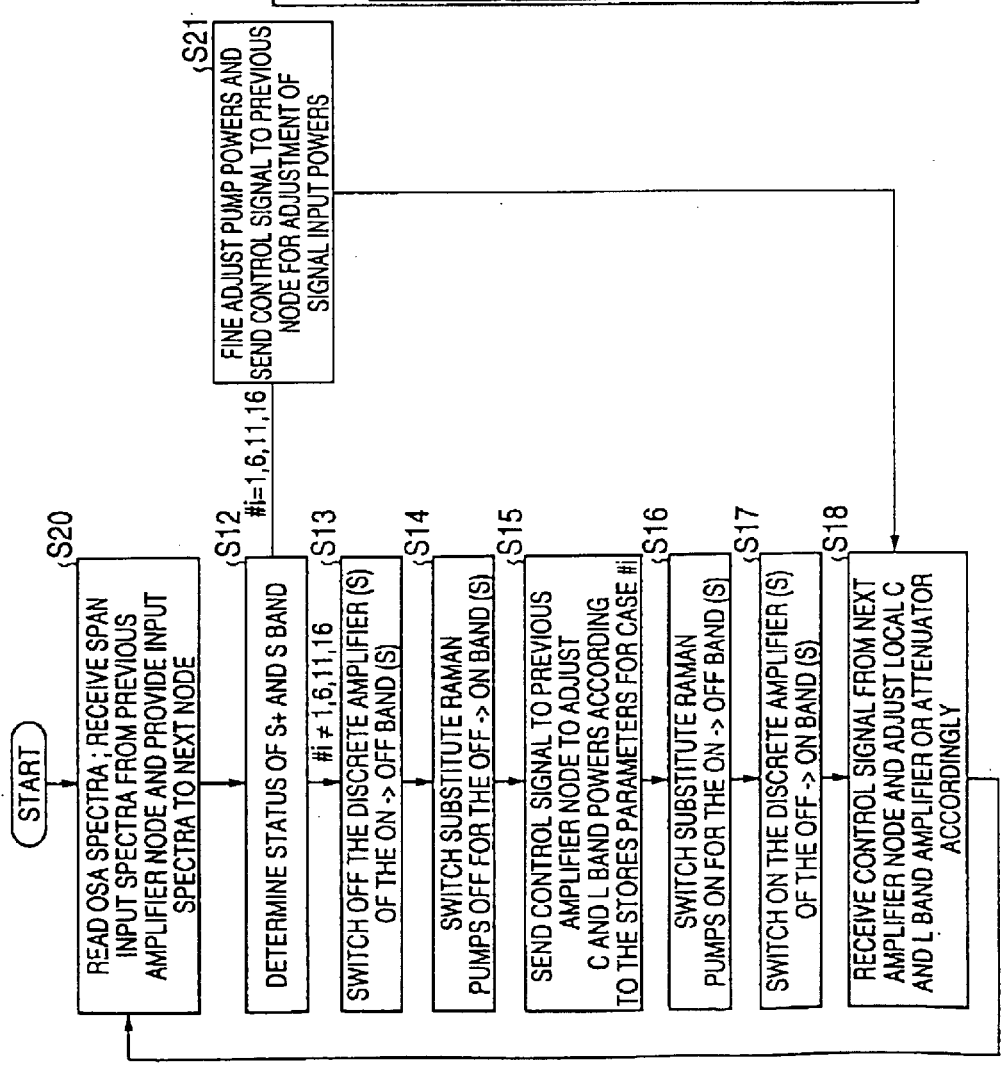
FIGS. 12A and 12B are diagrams showing a control operation of a CPU shown in FIG. 11.
Figure 12B:
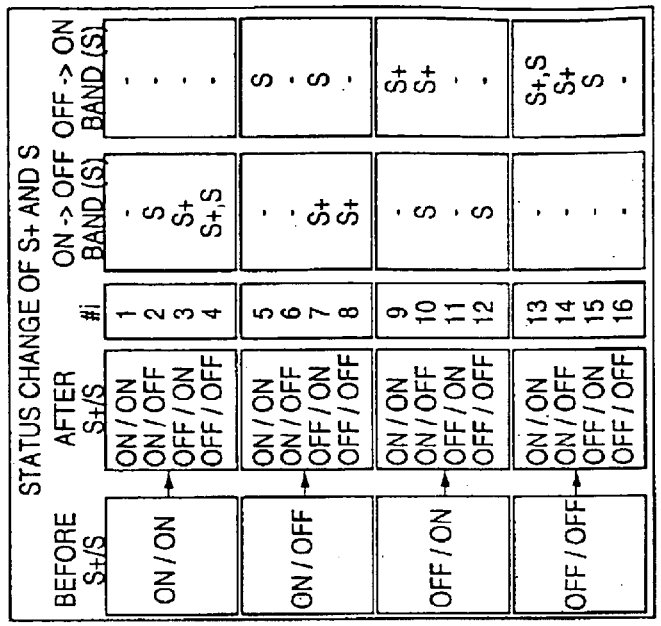

FIG. 12A is a flowchart of a control operation of the CPU 12 of the repeater node 100, and FIG. 12B shows a table describing possible status changes of S+ and S bands. The contents of the table shown in FIG. 12B are the same as those of the table shown in FIG. 10B. The control sequence shown in FIG. 12A includes steps S12 through S18 which have been described with reference to FIG. 10A, and particular steps S20 and S21 resulting from the use of the optical spectrum analyzers. In steps S12 through S18, the spectral data rather than the photodiode monitor outputs is used.

The CPU 12 executes step S20 at first. At step S20, the CPU 12 reads input and output spectral data from the optical spectrum analyzers 20 and 22. In addition, the CPU 12 receives span input spectral data from the previous repeater node (repeater node 200), and provides the input spectral data of the repeater node 100 to the next repeater node. Then, the CPU 12 executes step S12. If #i=1, 6, 11 or 16, the CPU 12 adjusts the pump powers by controlling the laser diodes of the working pumping power units among the units 46 through 49 via the corresponding D/A converters. This adjustment refers to the input and output spectral data and the input spectral data received from the previous repeater node. The input and output spectral data show the status of all the channels in each of the bands. Thus, it is possible to finely adjust the pump powers so that all the channels can be set at given pre-set levels stored in the EEPROM 13. Further, at step S21, the CPU 12 sends a control signal to the previous repeater node for adjustment of the signal input powers. Then, the CPU 12 executes step S18, which is followed by step S20.

The first and second embodiments of the present invention may be modified so that three or more Raman pumping lights can be used. The Raman pump light sources may be a multiple wavelength pump light source as disclosed, for instance, in WO 00/5622. The monitor photodiodes 36 and 37 used in the first embodiment of the present invention monitor the whole S+ and S bands, respectively. Alternatively, a set of monitor photodiodes can be combined with a WDM coupler device to monitor multiple wavelength groups (i.e. subbands) within a band simultaneously. The monitor photodiodes can be placed behind the amplifiers as well.

A description will be given of other embodiments of the present invention.

Figure 13A:
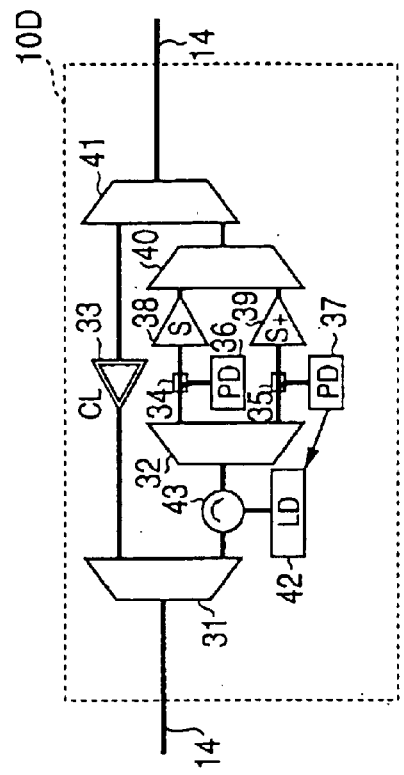
FIG. 13A is a block diagram of an optical repeater node according to a third embodiment of the present invention.

FIG. 13A is a block diagram of a repeater node 10C according to a third embodiment of the present invention. The repeater node 10C differs from the repeater node 10 in the position of the optical circulator 43. If the coupling loss of the WDM coupler 31 is sufficiently low at the short Raman pump wavelengths, the optical coupler 43 can be placed behind the WDM coupler 31, as shown in FIG. 13A. This has an advantage that the loss for the signal lights in the C and L bands in the transmission line is reduced.

Figure 13B:
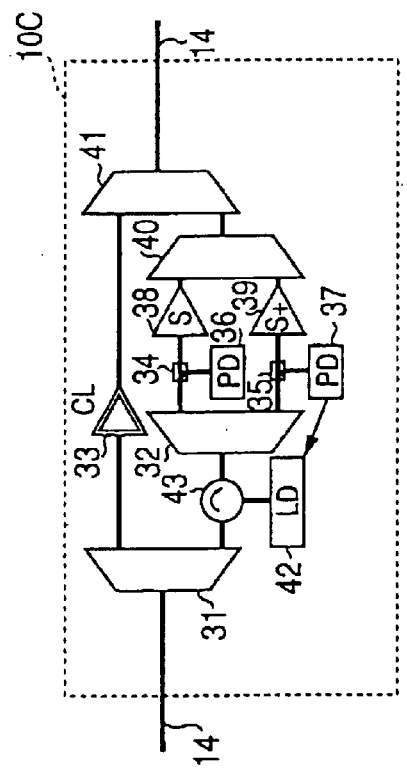
FIGS. 13B, 13C, and 13D are diagrams of variations of the optical repeater node shown in FIG. 13A.

FIG. 13B is a block diagram of a variation of the repeater node 10C. A repeater node 10D shown in FIG. 13B is arranged so that the C/L signal lights are counter-propagated with respect to the S+/S signal lights. That is, the S+/S Raman pump lights emitted by the Raman pump light source unit 42 are co-propagated with the C/L signal lights.

Figure 13C:
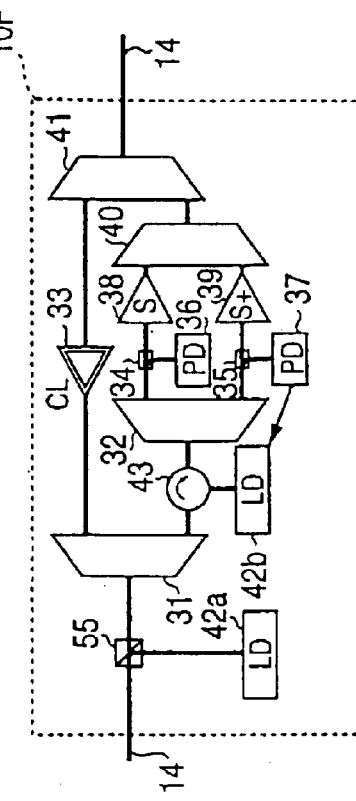

FIG. 13C is a block diagram of a modification 10E of the repeater node 10C. The Raman pump light source unit 42 used in the previously described embodiments of the present invention is separated into two units 42a and 42b. The unit 42a corresponds to the combination of the S+ and S Raman pump light source units 46 and 47 and the associated WDM coupler shown in FIG. 9. The unit 42b corresponds to the combination of the S+ and S signal substitution Raman pump light source units 48 and 49 and the associated WDM couplers shown in FIG. 13C. The S+/S Raman pump light source unit 42a is coupled to the optical fiber 14 in front of the WDM coupler 31 by a WDM coupler 55. The S+ and S signal substitution Raman pump light source unit 42b is coupled, by the optical circulator 43, to the corresponding inner optical fiber so as to be located behind the WDM coupler 31. With the above arrangement, the coupling losses for the S+/S Raman pump light can be reduced in comparison to repeater node 13A.

Figure 13D:
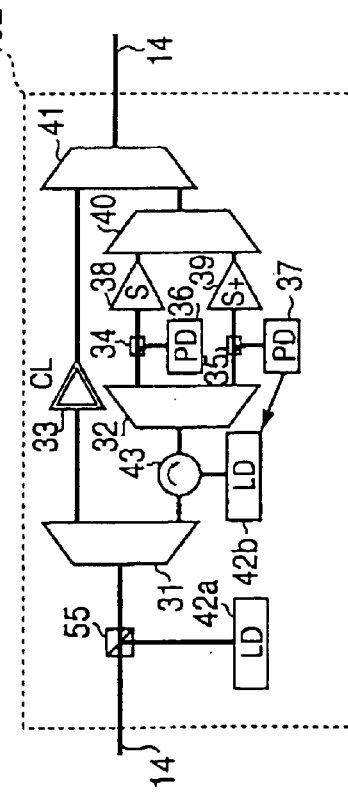

A variation of the repeater node 10E is illustrated as a repeater node 10F shown in FIG. 13D. The C/L signal lights are co-propagated with the Raman pump lights, and are counter-propagated with respect to the S+/S signal lights.

Figure 14A:
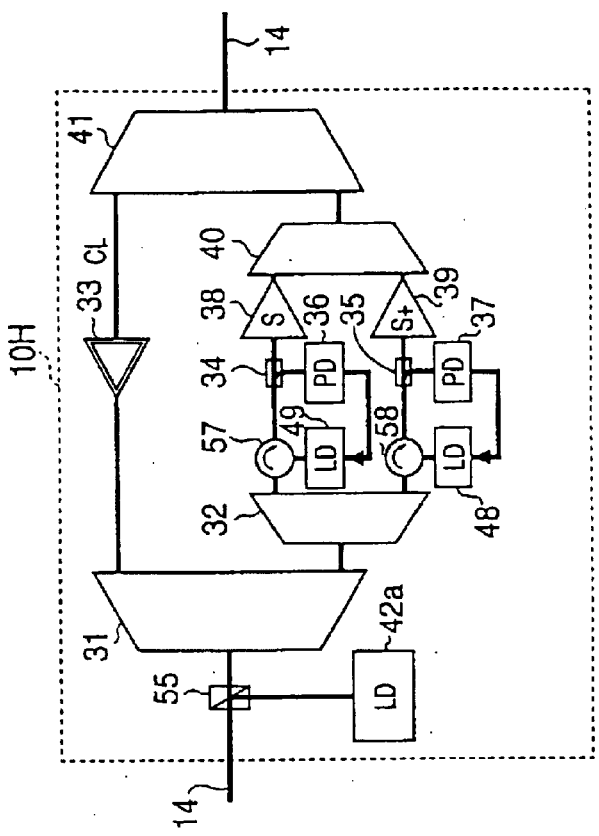
FIG. 14A is a block diagram of an optical repeater node according to a fourth embodiment of the present invention.

FIG. 14A is a block diagram of a repeater node 10G according to a fourth embodiment of the present invention. The S signal substitution Raman pump light source unit 49 is coupled to the corresponding inner S-signal transmission line so as to be located behind the WDM coupler 32. The monitor photodiode 36 monitors part of the S signal coming from the optical tap 34. The unit 49 is controlled based on the status of the S band. The S+ signal substitution Raman pump light source unit 48 is coupled to the corresponding inner S+-signal transmission line so as to be located behind the WDM coupler 32. The monitor photodiode 37 monitors part of the S+ signal coming from the optical tap 35. The unit 48 is controlled based on the status of the S+ band.

Figure 14B:
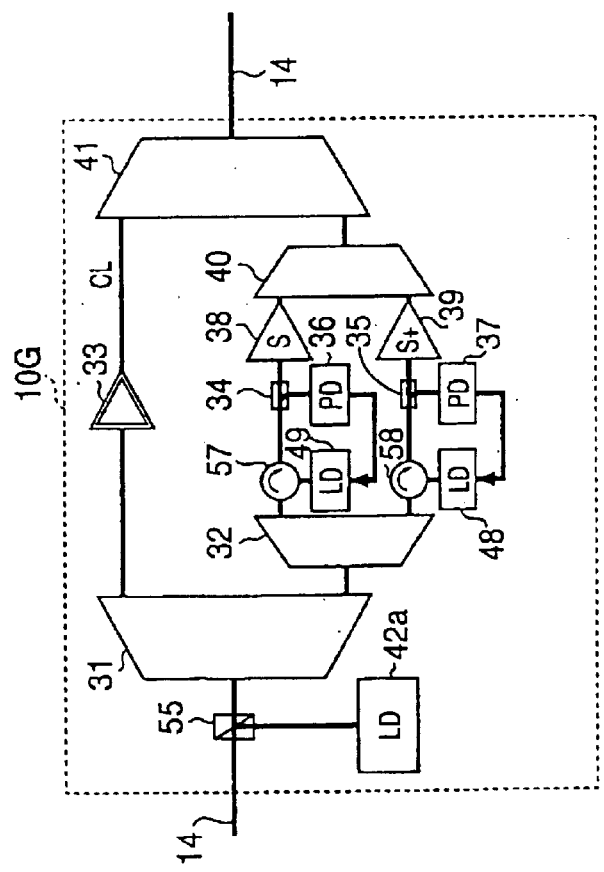
FIG. 14B is a block diagram of a variation of the repeater node shown in FIG. 14A.

FIG. 14B is a block diagram of a variation 10H of the repeater node 10G. The C/L signal lights are co-propagated with the Raman pump lights, and are counter-propagated with respect to the S+/S signal lights.

Figure 15A:
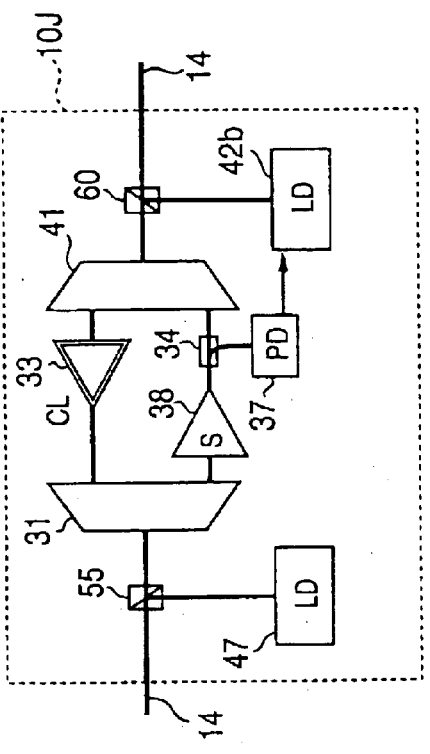
FIG. 15A is a block diagram of an optical repeater node according to a fifth embodiment of the present invention.

FIG. 15A is a block diagram of an optical repeater node 10I according to a fifth embodiment of the present invention, in which the signal wavelengths extend only to the S band. In this case, the Raman pump wavelengths can be allocated without spectrally overlapping with the signal wavelengths. This allows using a WDM device for coupling the S+ and S signal substitution Raman pumps into the transmission line. An integrated S Raman pump light/S+ and S signal substitution Raman pump light source unit 42c is coupled to the optical fiber 14 by means of a WDM coupler 55 located in front of the WDM coupler 31. The Raman pump lights emitted by the unit 42c are counter-propagated with respect to the S/C/L signal lights. The unit 42c includes the Raman pump light source units 47, 48 and 49 and the associated WDM couplers of the coupling unit 45 shown in FIG. 9. The S band is monitored by the monitor photodiode 37 coupled to the inner S signal transmission line extending from the WDM coupler 31.

The Raman pump light source unit 42c is controlled by the status of the S band monitored by the S signal monitor 37 under the control of the CPU 12. For example, the Raman pump light source unit 48 is maintained in the ON state, and Raman pump light source unit 49 is switched on/off based on the status of the S band. Alternatively, the S+ and S signal substitution light source units 48 and 49 may be simultaneously switched on/off based on the status of the S band.

Figure 15B:
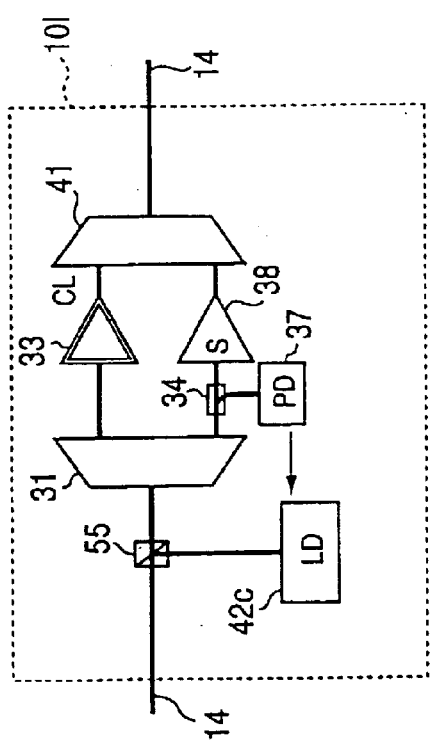
FIG. 15B is a block diagram of a variation of the repeater node shown in FIG. 15A.

FIG. 15B is a block diagram of a variation 10J of the repeater node 10I. The S band Raman pump light is co-propagated. The Raman pump light source unit 42 is separated into the S Raman pump light source unit 47 and an S+ and S signal substitution Raman pump light source unit 42b. The unit 42b is coupled to the optical fiber 14 forming the transmission line by a WDM coupler 60 located in front of the WDM coupler. 41. The S+ and S signal substitution Raman pump lights are counter-propagated with respect to the C/L signal lights. The S pump light is co-propagated with the C/L signal lights. The S+ and S signal substitution Raman pump light source unit 42b is controlled by the status of the S band monitored by the monitor photodiode 37.

Figure 16A:
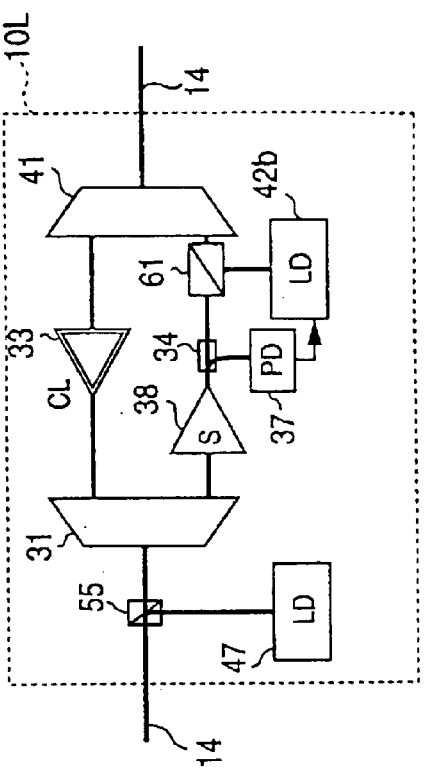
FIG. 16A is a block diagram of another variation of the repeater node shown in FIG. 15A.

FIG. 16A is a block diagram of an optical repeater node 10K, which is another variation of the repeater node 10I. A WDM coupler 61 is located behind the WDM coupler 31. The S+ and S signal substitution Raman pump light source 42b is coupled to the inner S signal transmission line by the WDM coupler 61. The S Raman pump light and the S+/S signal substitution Raman pump lights are counter-propagated with respect to the S/C/L signal lights.

Figure 16B:
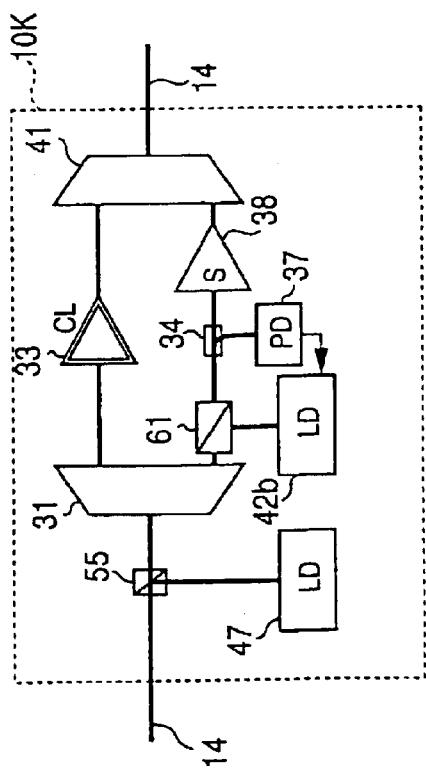
FIG. 16B is a block diagram of a variation of optical repeater node.

FIG. 16B is a block diagram of a variation 10L of the repeater node 10K. The WDM coupler 61, to which the S+ and S signal substitution Raman pump light source 42 is coupled, is located behind the S-band amplifier 38. The S+ and S signal substitution Raman pump lights are counter-propagated with respect to the C/L signal lights. The S Raman pump lights are co-propagated with the C/L signal lights.

Figure 17A:
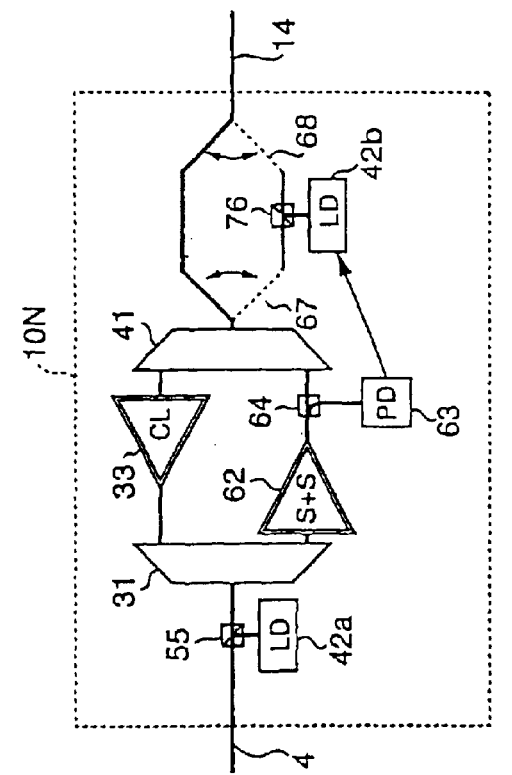
FIG. 17A is a block diagram of an optical repeater node according to a sixth embodiment of the present invention.

FIG. 17A is a block diagram of an optical repeater node 17A according to a sixth embodiment of the present invention. In this embodiment, a pair of optical switches 65 and 66 is used to realize a protection for the C/L band transmission in the case of an interruption of the S+ and/or S band transmission. The optical switches 65 and 66 are coupled to respective inner transmission lines via WDM couplers 75 and 76. Each of the optical switches 65 and 66 allows choosing between two optical paths. The pair of optical switches 65 and 66 are located in front of the WDM coupler 31, and selectively connects either the S+/S Raman pump light source unit 42a or the S+ and S signal substitution Raman pump light source unit 42b to the transmission line.

The optical switches 65 and 66 are controlled together with the S+ and S signal substitution Raman pump light source unit 42b by the CPU 12, as shown in FIG. 9. The monitor output status is supplied from the previous repeater node. The switching control of the optical switches 65 and 66 is the same as the aforementioned on/off control of the Raman pump light source units. That is, the optical switches 65 and 66 are operated in accordance with the table shown in FIG. 10B.

It is to be noted that the optical switches 65 and 66 do not permit the simultaneous transmission of the S+ and S signal substitution-Raman pump lights and the S+/S signal lights. Therefore, it is required to perform switching between the S+/S Raman pump lights and the S+ and S signal substitution Raman pump lights. This means that only the whole S+ and S band can be substituted. The Raman pump lights are counter-propagated with the signal lights.

An S+/S amplifier stage 62 is used to amplify the signal lights in the S+ and S bands. A monitor photodiode 63 monitors the state of the S+ and S bands. The monitor output for controlling the S+ and S signal substitution Raman pump light source unit of the next repeater node is sent to the next repeater node. The S+/S/C/L signal lights are co-propagated.

Figure 17B:
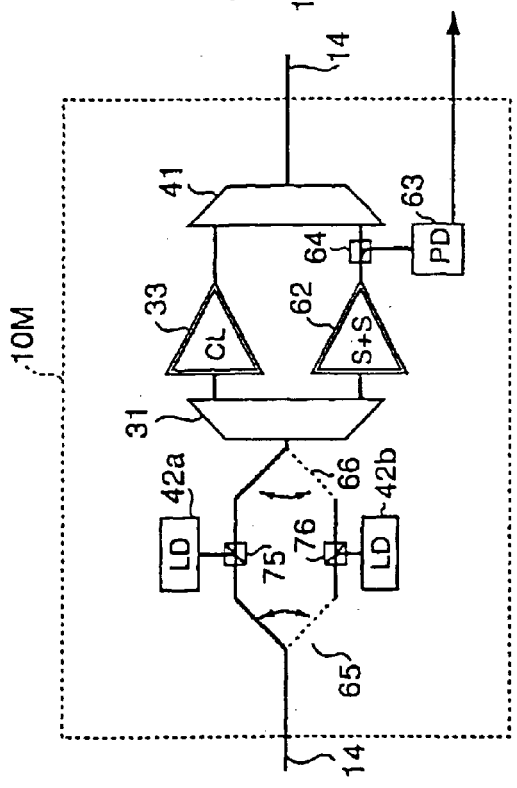
FIG. 17B is a block diagram of a variation of the repeater node shown in FIG. 17A.

FIG. 17B is a block diagram of a variation 10N of the optical repeater node 10M. A pair of optical switches 67 and 68 is provided in front of the WDM coupler 41. The S+ and S signal substitution Raman pump light source unit 42b is selectively coupled to the optical fiber 14 by the switches 67 and 68 controlled by the CPU 12. The C/L signal lights are counter-propagated with respect to the S+/S signal lights, and are co-propagated with the S+/S Raman pump lights. The S+ and S signal substitution Raman pump lights are counter-propagated with respect to the C/L signal lights. The monitor output of the photodiode 63 located behind the S+/S amplifier stage 62 is used by the CPU 12 to control the switches 67 and 68 and the S+ and S signal substitution Raman pump light source unit 42b.

Figure 18A:
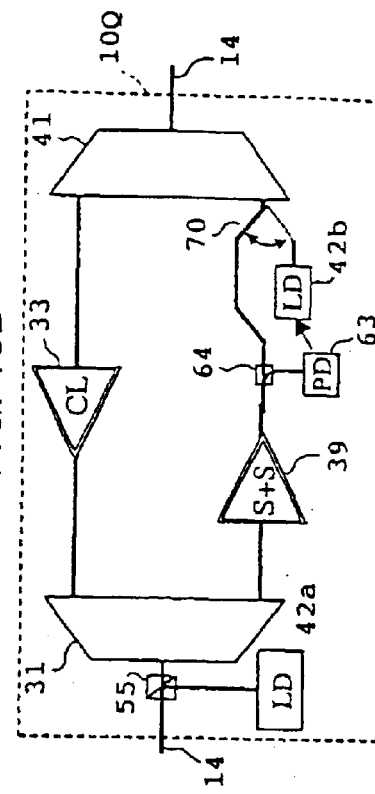
FIG. 18A is a block diagram of an optical repeater node according to a seventh embodiment of the present invention.

FIG. 18A is a block diagram of an optical repeater node 10P according to a seventh embodiment of the present invention. An optical switch 69 for selectively coupling the S+ and S signal substitution Raman pump light source unit 42b with the transmission line is provided behind the WDM coupler 31. The optical switch 69 is switched on/off by the status of the S+ and S bands monitored by the monitor photodiode 63 under the control of the CPU 12. The S+/S Raman pump light source unit 42a is provided in front of the WDM coupler 31 and is coupled to the optical fiber via the WDM coupler 55. The S+/S/C/L signal lights are co-propagated, while the S+/S Raman pump lights and S+/S signal substitution Raman pump lights are counter-propagated with respect to the signal lights. The CPU 12 controls the S+ and S signal substitution Raman pump light source unit 42b and the optical switch 69 on the basis of the status of the S+/S bands monitored by the photodiode 63.

Figure 18B:
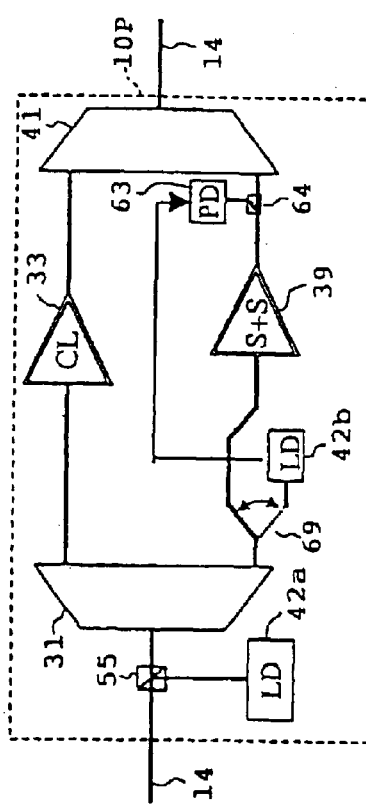
FIG. 18B is a block diagram of a variation of the repeater node shown in FIG. 18A.

FIG. 18B is a block diagram of a variation 10Q of the repeater node 10P. An optical switch 70 is provided behind the WDM element 31 as the repeater node shown in FIG. 18A, but is located in a different position. The S+ and S signal substitution Raman pump light source unit 42b is selectively coupled to the WDM coupler 41 by the switch 70 based on the status of the S+/S bands under the control of the CPU 12. The S+ and S signal substitution Raman pump lights, which are switched based on the status of the S+/S bands, are counter-propagated with respect to the C/L signal lights and the S+/S Raman pump lights.

FIG. 19A is a block diagram of an optical repeater node 10R according to an eighth embodiment of the present invention. The Raman pump light source unit 48 for substitution for S+ signal lights is coupled behind the WDM coupler 56 by an optical switch 72. The Raman pump light source unit 49 for substitution for S signal lights is coupled behind the WDM coupler 56 by an optical switch 71. The CPU 12 controls the Raman pump light source unit 48 and the switch 72 on the basis of the status of the S+ band monitored by the photodiode 37. Similarly, the CPU 12 controls the Raman pump light source unit 49 and the switch 71 on the basis of the status of the S band monitored by the photodiode 36. The S+/S Raman pump light source unit 42a is coupled to the optical fiber 14 via the WDM coupler 55. The S+/S Raman pump lights and the /S+ and S signal substitution Raman pump lights are co-propagated, and counter-propagated with respect to the S+/S/C/L signal lights.

FIG. 19B is a block diagram of a variation 10S of the optical amplifier 10R. The optical switches 73 and 74 are provided behind the optical amplifiers 38 and 39, respectively. The optical switch 73 selectively couples the Raman pump light source 49 with the WDM coupler 40 based on the status of the S band under the control of the CPU 12. Similarly, the optical switch 74 selectively couples the Raman pump light source 48 with the WDM coupler 40 based on the status of the S+ band under the control of the CPU 12. The S+ and S signal substitution Raman pump lights are counter-propagated with respect to the C/L signal lights and the S+/S Raman pump light source unit 42a.

FIG. 25A shows an optical setup for monitoring part of the forward and the backward propagating lights S+S/CL bi-directional transmission systems by using optical spectrum analyzers. The forward propagating lights are in the S+ and S bands, and the backward propagating lights are in the C and L bands. Optical taps 160 and 161 are provided in front and behind the amplifier stage. A WDM coupler 162 couples parts of incoming signals of the amplifier stage. A WDM coupler 163 couples parts of outgoing signals. An optical spectrum analyzer (OSA) 164 connected to the WDM coupler 162 monitors the power levels of the incoming signals. An optical spectrum analyzer (OSA) 165 connected to the WDM coupler 163 monitors the power levels of the outgoing signals. The optical spectrum analyzers 164 and 165 communicate with the CPU 12.

A description will be given of an optical repeater node according to a ninth embodiment of the present invention. This repeater node is used in DWDM systems as shown in FIG. 2D. In DWDM systems, impairments due to nonlinear interaction between neighboring channels can be reduced by channel-interleaved bi-directional transmission. The channel-interleaving is illustrated in a graph in FIG. 2D. The channels of the opposite (forward and backward) propagating directions respectively illustrated by solid and broken lines are interleaved. At the amplifier stage, optical circulators are used to separate forward and backward propagating channels. The amplifier structure for each direction is similar to that in the aforementioned first through eighth embodiments of the present invention. The difference is that all lights in one branch are propagated in the same direction.

Figure 20A:
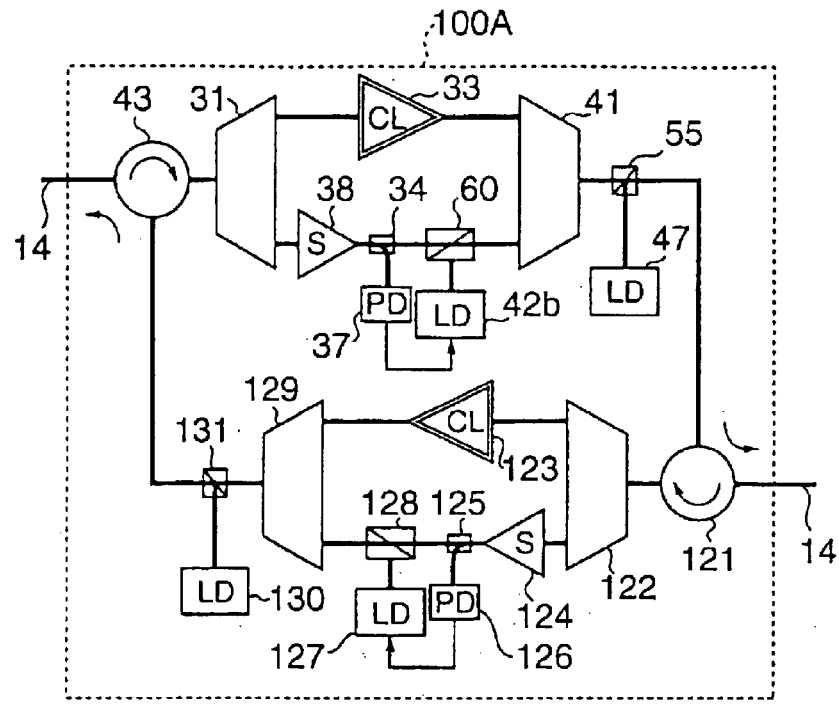
FIG. 20A is a block diagram of an optical repeater node according to a ninth embodiment of the present invention.

FIG. 20A is a block diagram of an optical repeater node 100A according to the ninth embodiment of the present invention, which can be applied to the channel-interleaved bi-directional S/C/L transmission systems. The repeater node 100A processes three bands of S, C and L. The repeater node 100A is coupled to the optical transmission line formed of the optical fiber 14 via optical circulators 43 and 121, which make two amplifier systems. One of the two systems includes a first optical amplifier involved in the forward propagation and made up of the aforementioned components. Similarly, the other system includes a second optical amplifier having the same structure as the first optical amplifier. The second amplifier involved in the backward propagation is made up of a WDM coupler 122, a C/L amplifier stage 123, an S band amplifier 124, an optical tap 125, a monitor photodiode 126, a S+ and S signal substitution Raman pump light source unit 127, a WDM coupler 129, an S band Raman pump light source unit 130, and a WDM coupler 131.

Multiplexed light passes through the circulator 43, and is applied to the WDM coupler 31. The C/L signal lights are applied to the C/L amplifier stage 33. The S signal and S-band pump lights are applied to the S-band amplifier 38. The S+ and S signal substitution Raman pump source unit 42b is controlled by the CPU 12 on the basis of the status of the S band in the forward propagation monitored by the photodiode 37 via the optical tap 34. The S+ and S signal substitution Raman pump lights are multiplexed with the amplified S-band signal lights and the C/L signal lights via the WDM coupler 60 and the WDM coupler 41. Further, the S Raman pump lights are coupled with the output of the WDM coupler 41 by the WDM coupler 55. Then, the multiplexed light is sent to the optical fiber 14 via the circulator 121.

Similarly, multiplexed light passes through the circulator 121, and is applied to the WDM coupler 122. The C/L signal lights and the S+/S signal substitution Raman pump lights, if any, are applied to the C/L amplifier stage 123. The S signal and S-band pump lights are applied to the S-band amplifier 124. The S+ and S signal substitution Raman pump source unit 127 is controlled by the CPU 12 on the basis of the status of the S band in the backward propagation monitored by the photodiode 126 via the optical tap 125. The S+ and S signal substitution Raman pump lights are multiplexed with the amplified S-band signal lights and the C/L signal lights via the WDM coupler 128 and the WDM coupler 129. Further, the S Raman pump lights are coupled with the output of the WDM coupler 129 by the WDM coupler 131. Then, the multiplexed light is sent to the optical fiber 14 via the circulator 43.

Figure 20B:
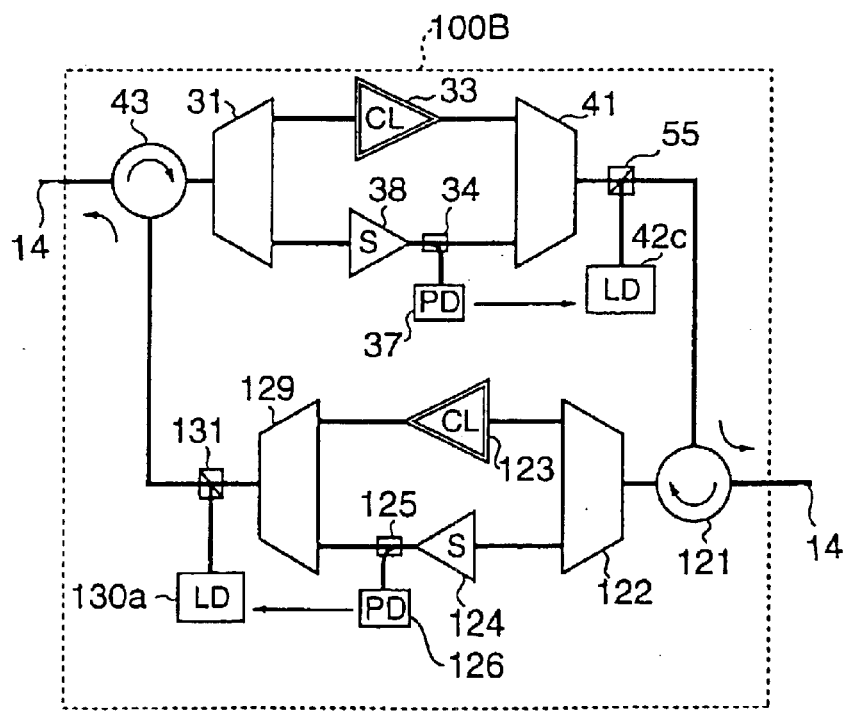
FIG. 20B is a block diagram of a variation of the repeater node shown in FIG. 20A.

FIG. 20B is a block diagram of a variation 100B of the optical repeater node 10A shown in FIG. 20A. The S Raman pump light /S+ and S signal substitution Raman pump light source unit 42c is provided behind the WDM coupler 41 via the WDM coupler 55. The CPU 12 controls the unit 42c based on the status of the S band monitored by the monitor photodiode 37 coupled to the inner S-band forward transmission line extending from the S-band amplifier 38 via the WDM tap 34. Similarly, an integrated S Raman pump/S+ and S signal substitution Raman pump light source unit 130a is provided behind the WDM coupler 129 via the WDM coupler 131. The CPU 12 controls the unit 130a on the basis of the status of the S band monitored by the monitor diode 126 coupled to the inner-S band backward transmission line extending from the S-band amplifier 124.

Figure 21:
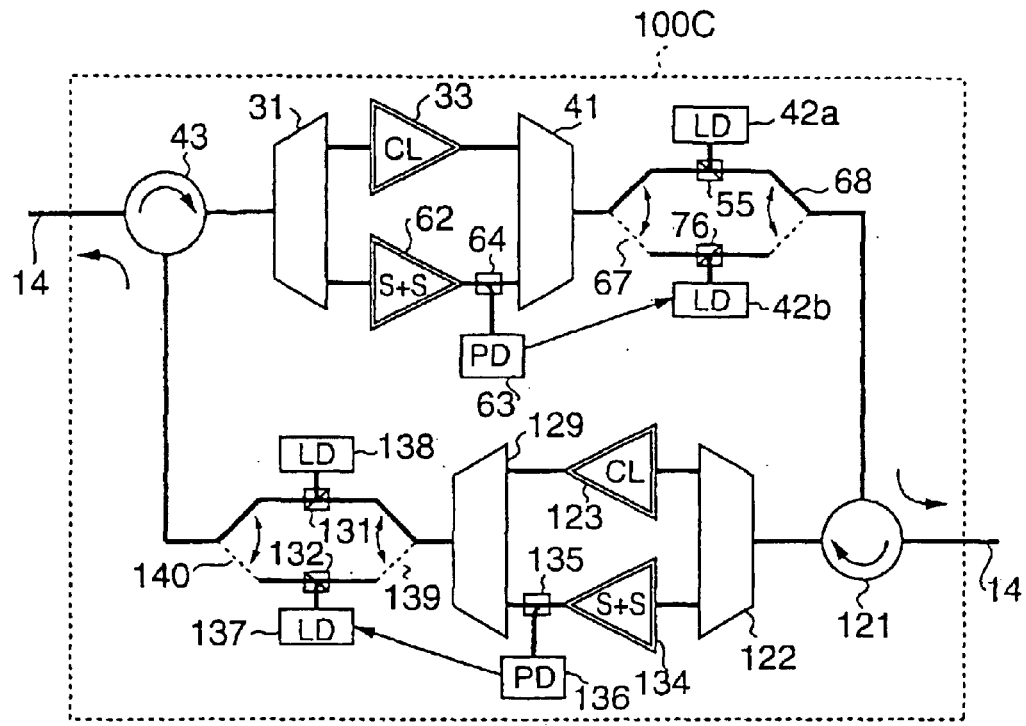
FIG. 21 is a block diagram of an optical repeater node according to a tenth embodiment of the present invention.

FIG. 21 is a block diagram of an optical repeater node 100C according to a tenth embodiment of the present invention. The device 100C can be applied to the channel-interleaved bi-directional transmission systems which have the S+/S/C/L bands. The forward amplifier system includes the aforementioned WDM coupler 31, the C/L amplifier stage 33, the S+/S amplifier stage 62, the WDM coupler 41, the optical tap 69, the S+/S band monitor photodiode 63, the S+/S Raman pump light source unit 42a, the WDM coupler 55, the S+ and S signal substitution Raman pump light source unit 42b, the WDM coupler 76, and the optical switches 67 and 68. Similarly, the backward amplifier system includes the aforementioned WDM coupler 122, the C/L amplifier stage 123, an S+/S amplifier stage 134, the WDM coupler 129, an optical tap 135, an S+/S band monitor photodiode 136, an S+/S Raman pump light source unit 138, a WDM coupler 131, an S+ and S signal substitution Raman pump light source unit 137, a WDM coupler 132, and optical switches 139 and 140.

The switches 67 and 68 and the Raman pump light source units 42a and 42b are controlled by the CPU 12 on the basis of the status of the S+/S bands in the forward propagation monitored by the photodiode 63. Similarly, the switches 139 and 140 and the Raman pump light source units 137 and 138 are controlled by the CPU 12 on the basis of the status of the S+/S bands in the backward propagation monitored by the photodiode 136. If the forward S+ and/or S band fails, the S+ and S signal substitution Raman pump light source unit 42 is selected by the optical switches 67 and 68. Similarly, if the backward S+ and/or S band fails, the S+ and S signal substitution Raman pump light source unit 137 is selected by the optical switches 139 and 140.

Figure 22:
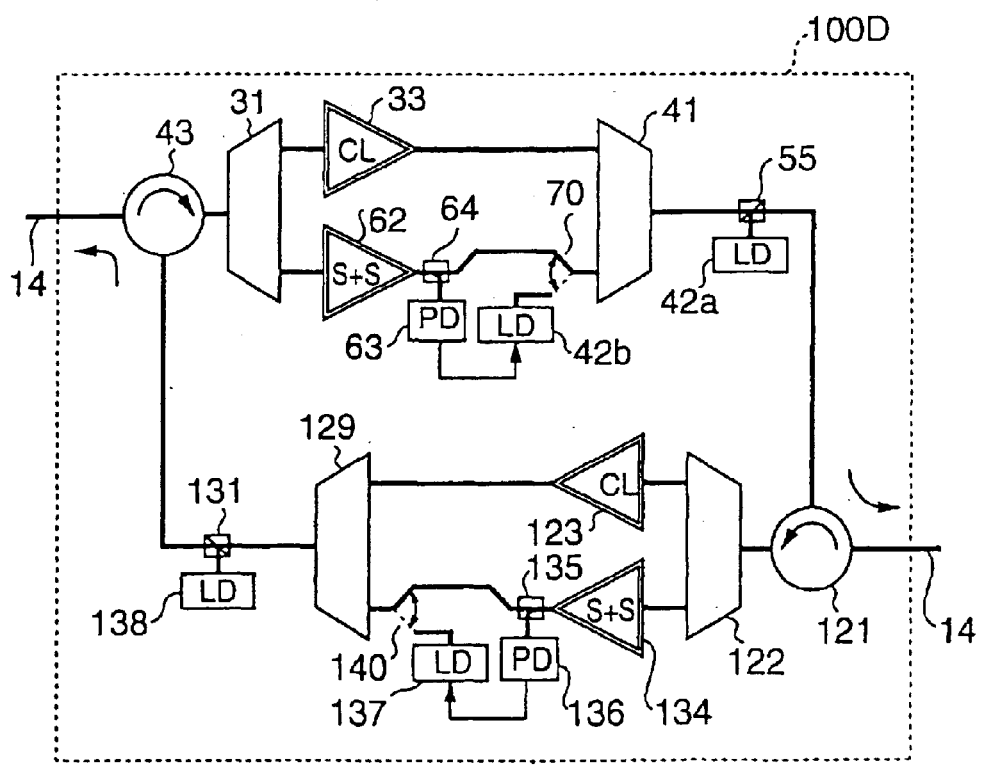
FIG. 22 is a block diagram of an optical repeater node according to an eleventh embodiment of the present invention.

FIG. 22 is a block diagram of an optical repeater node 100D according to an eleventh embodiment of the present invention. The first (forward) amplifier system is made up of the WDM coupler 31, the C/L amplifier stage 33, the S+/S amplifier stage 62, the optical tap 64, the monitor photodiode 63, the S+and S signal substitution Raman pump light source unit 42b, the optical switch 70, the WDM coupler 41, the S+/S Raman pump light source unit 42a and the WDM coupler 55. The S+ and S signal substitution Raman pump light source unit 42b controlled based on the status of the S+/S bands monitored by the photodiode 63 is selectively coupled to the WDM coupler 41 via the optical switch 70. The optical switch 70 is controlled by the CPU 12 to select the S+ and S signal substitution Raman pump light source unit 42b for protection of the C/L band transmission in the forward propagation. The S+/S Raman pump light source unit 42a is coupled to the circulator 121 via the WDM coupler 55.

The second (backward) amplifier system is made up of the WDM coupler 122, the C/L amplifier stage 123, the S+/S amplifier stage 134, the optical tap 135, the monitor photodiode 136, the S+ and S signal substitution Raman pump light source unit 137, the optical switch 140, the WDM coupler 129, the WDM coupler 131, and the S+/S Raman pump source unit 138. The S+ and S signal substitution Raman pump light source unit 137 controlled on the basis of the status of the S+/S bands monitored by the photodiode 136 is selectively coupled to the WDM coupler 129 via the optical switch 140. The optical switch 140 is controlled by the CPU 12 to select the S+ and S signal substitution Raman pump light source unit 137 for protection of the C/L band transmission in the backward propagation. The S+/S Raman pump light source unit 138 is coupled to the circulator 43 via the WDM coupler 131.

Figure 23:
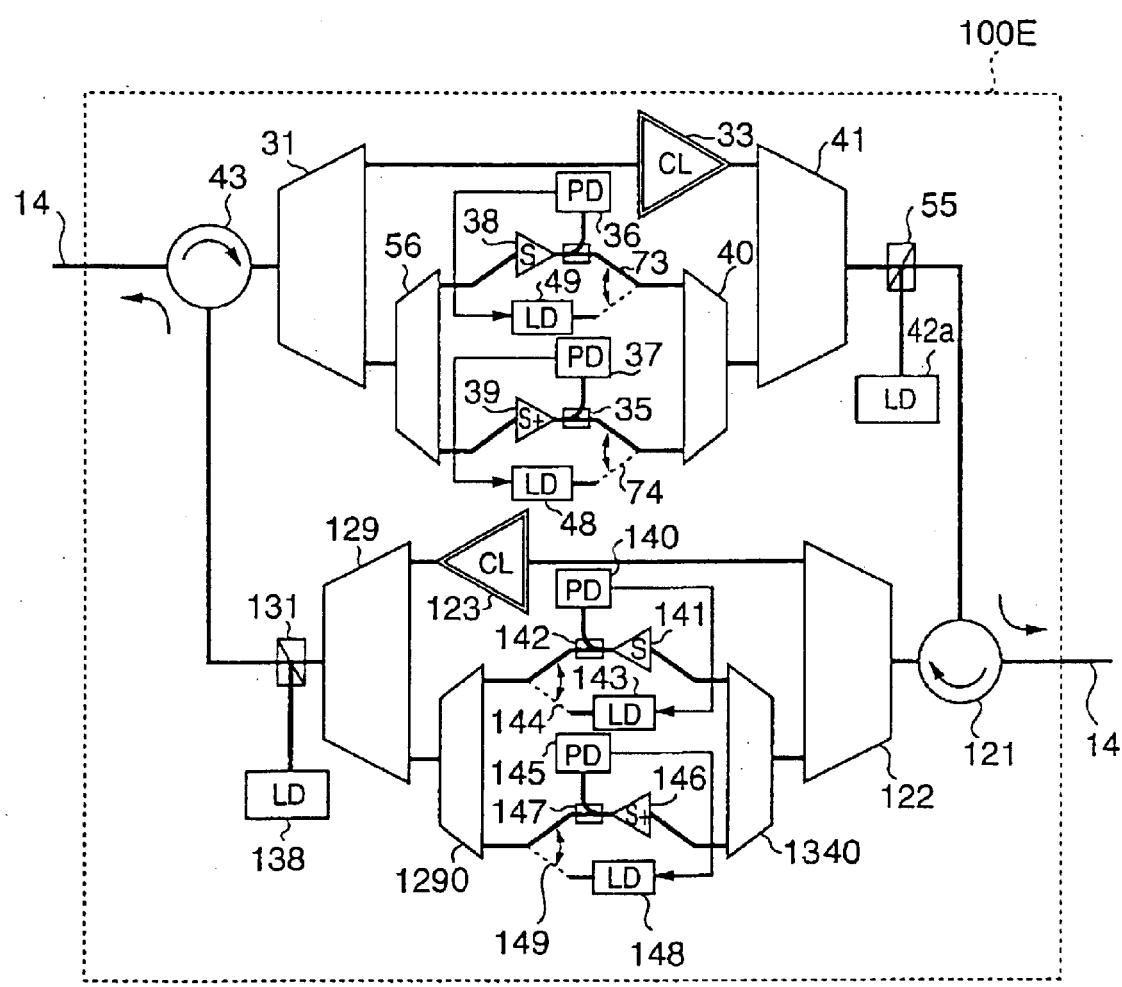
FIG. 23 is a block diagram of an optical repeater node according to a twelfth embodiment of the present invention.

FIG. 23 is a block diagram of an optical repeater node 100E according to a twelfth embodiment of the present invention. The first (forward) amplifier system is configured as shown in FIG. 19B except for the position of the WDM coupler 55 to which the S+/S Raman pump light source unit 42a is connected. The WDM coupler 55 of the repeater node 100E is connected to the output of the WDM coupler 41. The second (backward) amplifier system has the same structure as the first amplifier system. More particularly, the second amplifier system includes the WDM coupler 122, the C/L amplifier stage 123, a WDM coupler 1340, a WDM coupler 1290, a monitor photodiode 140, an S-band amplifier 141, an optical tap 142, an S signal substitution Raman pump light source unit 143, an optical switch 144, a monitor photodiode 145, an S+-band amplifier 146, an optical tap 147, an S+ signal substitution Raman pump light source unit 148, an optical coupler 149, the S+/S Raman pump light source unit 138 and the WDM coupler 129.

If the S band fails, the CPU 12 controls the optical switch 144 to select the Raman pump light source unit 143 rather than the S amplifier 141. If the S+ band fails, the CPU 12 controls the optical switch 149 to select the S+ signal substitution Raman pump light source unit 148 rather than the S+ amplifier 146.

Figure 24:
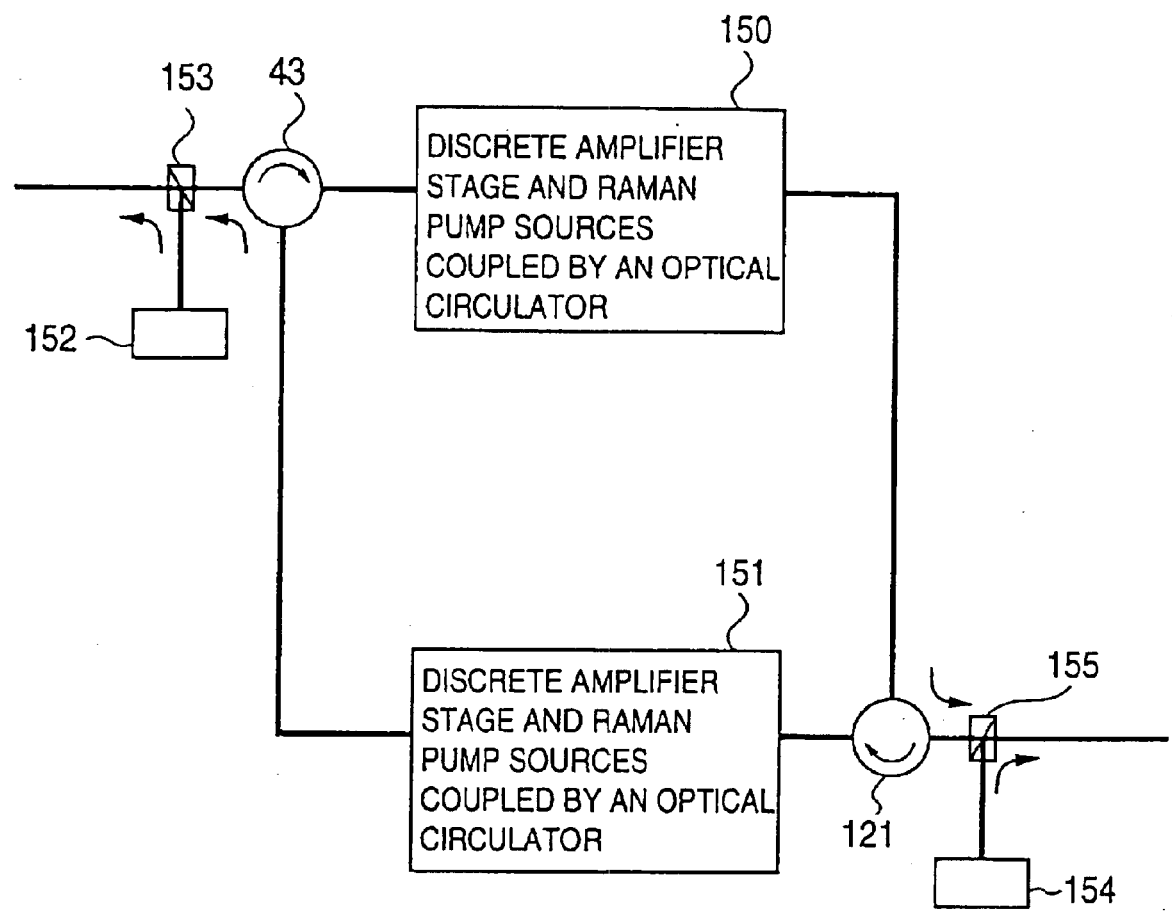
FIG. 24 is a block diagram of a variation of the repeater nodes shown in FIGS. 20A, 20B and 21 through 23.

FIG. 24 is a block diagram of a variation of any of the optical amplifier units 100 and 100B–100E. If the Raman pump lights does not spectrally overlap with the signal wavelengths, the associated Raman pump light sources can be outsides of the optical circulators 43 and 121 between which two amplifier stages 150 and 151 are formed. A Raman pump light source unit 152 which emits Raman pump lights that do not spectrally overlap with the signal wavelengths is coupled to the optical transmission line via a WDM coupler 153. Similarly, a Raman pump light source unit 154 which emits Raman pump lights that do not spectrally overlap with the signal wavelengths is coupled to the optical transmission line via a WDM coupler 155.

In the optical repeater nodes 100 and 100B–100E, the monitor photodiodes are used. Rather, optical spectrum analyzers may be employed.

FIG. 25B shows an optical setup for monitoring part of the forward and the backward propagating lights in channel-interleaved bi-directional transmission systems by using optical spectrum analyzers. The forward propagating lights are involved in even channels, and the backward propagating lights are involved in odd channels. Rather than the WDM couplers 162 and 163, optical switches 166 and 167 are used as shown in FIG. 25B.

The present invention is not limited to the specifically described first through twelfth embodiments, variations and modifications thereof.

For example, a different number of Raman pumping lights may be used. The Raman pump sources can be multiple wavelengths pump sources as disclosed, for instance, WO00/05622. Also, wavelength tunable pump light sources may be used. A single photodiode can be either used to monitor the is whole optical band, or a set of photodiodes can be combined with a WDM coupler device to monitor the multiple wavelength groups (i.e. subbands) within a band simultaneously. The monitor photodiodes can be placed behind the amplifiers as well.

The present invention includes systems with other combinations of co-and counter-propagating signal and pump lights such as a system in which the S+/S pump lights are co-propagated with the signal lights. The present invention includes systems which use a different set of bands, such as a system using S+/C/L bands, as well as systems including the wavelength region beyond the L band (i.e. L+ band).

It is to be noted that the present invention provides a scheme which allows in-service upgrading of wideband WDM systems, in which the power transfer from comparatively short wavelength channels to comparatively long wavelength channels for reliable transmission of the long wavelength channels. If in such systems first a small number of short wavelength channels is employed, but the addition of further short wavelength channels should be kept optional, a provision for later in-service upgradability has to be made. For this purpose, a small number of short wavelengths substitute Raman pumps provide the power to comparatively longer wavelength channels. Each substitute pump wavelength replaces a group of short wavelength channels to be installed later.

What is claimed is:

1. An optical amplifier device used for a system in which a power transfer takes place from comparatively short wavelength signal to a comparatively long wavelength signal, the optical amplifier device comprising:

an amplifier stage coupled to an optical transmission medium;

a monitor monitoring an absence status of a signal in a first band; and a pump light source unit supplying at least one first pump light to the optical transmission medium on the basis of the absence status of the first band monitored, so that said at least one first pump light supplies additional power to longer wavelength channels related to the absence status of the first band.

2. The optical amplifier device as claimed in claim 1, further comprising a controller which switches on the pump light source unit to emit said at least one first pump light if the monitor detects the absence of a signal in the first band.

3. The optical amplifier device as claimed in claim 1, wherein the pump light source unit supplies a plurality of first pump lights of different wavelengths.

4. The optical amplifier device as claimed in claim 1, wherein:

the monitor monitors the absence status of a second band in addition to the first band; and the pump light source unit supplies at least one second pump light to the optical transmission medium on the basis of the absence status of the second band monitored, so that said at least one second pump light supplies additional power to longer wavelength channels related to the absence status of the second band.

5. The optical amplifier device as claimed in claim 4, wherein the monitor monitors a power level of the second band.

6. The optical amplifier device as claimed in claim 4, further comprising a controller which switches on the pump light source unit to emit said at least one first pump light and said at least one second pump light if the monitor detects the absence of signals in the first and second bands, respectively.

7. The optical amplifier device as claimed in claim 4, wherein:

the pump light source unit supplies a plurality of second pump lights of different wavelengths.

8. The optical amplifier device as claimed in claim 1, further comprising an optical circulator coupling the pump light source unit to the optical transmission medium.

9. The optical amplifier device as claimed in claim 1, further comprising an WDM (Wavelength Division Multiplexing) coupler for coupling the pump light source unit to the optical transmission medium.

10. The optical amplifier device as claimed in claim 1, wherein said at least one first pump light is propagated through the optical transmission medium in a direction identical to that in which the longer wavelength channels are propagated.

11. The optical amplifier device as claimed in claim 1, wherein said, at least one first pump light is propagated through the optical transmission medium in a direction opposite to that in which the longer wavelength channels are propagated.

12. The optical amplifier device as claimed in claim 1, wherein:

said amplifier stage includes a plurality of amplifier systems; and said at least one first pump light is supplied to the optical transmission medium via one of the plurality of amplifier systems.

13. The optical amplifier device as claimed in claim 4, wherein:

the amplifier stage includes amplifier systems; and said at least one first pump light and said at least one second pump light are supplied to the optical transmission medium via said respective amplifier systems.

14. The optical amplifier device as claimed in claim 4, wherein said amplifier stage includes amplifier systems, sand the monitor includes parts that are connected to the respective amplifier systems and respectively monitor the absence status of the first and second bands.

15. The optical amplifier device as claimed in claim 1, further comprising an optical switch selectively coupling the pump light source unit to the optical transmission medium.

16. The optical amplifier device, as claimed in claim 15, wherein the optical switch is provided in front of the amplifier stage.

17. The optical amplifier device as claimed in claim 15, wherein the optical switch is provided within the amplifier stage.

18. The optical amplifier device as claimed in claim 1, wherein the monitor includes a photodiode.

19. The optical amplifier device as claimed in claim 1, wherein the monitor includes an optical spectrum analyzer.

20. The optical amplifier device as claimed in claim 1, wherein:

the monitor monitors the absence status of a plurality of bands including said first band; and the pump light source unit supplies a plurality of pump lights including said at least one first pump unit to the optical transmission medium on the basis of the absence status of the plurality of bands monitored, so that the plurality of pump lights supply additional power to longer wavelength channels related to the absence status of the plurality of bands.

21. The optical amplifier device as claimed in claim 1, wherein said at least one first pump light is a Raman pump light.

22. An optical amplifier device used for a bi-directional system in which a power transfer takes place from comparatively short wavelength signal to a comparatively long wavelength signal, the optical amplifier device comprising:

first and second amplifier systems; and directional coupling elements coupling the first and second amplifier stages to an optical transmission medium, each of said first and second amplifier systems comprising:

an amplifier stage coupled to the optical transmission medium;

a monitor monitoring a an absence status of a signal in a first band; and a pump light source unit supplying at least one first pump light to the optical transmission medium on the basis of the absence status of the first band monitored, so that said at least one first pump light supplies additional power to longer wavelength channels related to the absence status of the first band.

23. The optical amplifier device as claimed in claim 22, wherein the monitor monitors the absence status of a second band in addition to the first band and the pump light source unit supplies at least one second pump light to the optical transmission medium on the basis of the absence status of the second band monitored, so that said at least one second pump light supplies additional power to longer wavelength channels related to the absence status of the second band.

24. The optical amplifier device as claimed in claim 22, wherein the monitor monitors the absence status of a plurality of bands including said first band and the pump light source unit supplies a plurality of pump lights including said at least one first pump unit to the optical transmission medium on the basis of the absence status of the plurality of bands monitored, so that the plurality of pump lights supply additional power to longer wavelength channels related to the absence status of the plurality of bands.

25. A method of controlling an optical amplifier device, comprising:

monitoring an absence status of a first band; and supplying at least one first pump light to an optical transmission medium on the basis of the absence status of the first band monitored, so that said first pump light supplies additional power to longer wavelength channels related to the absence status of the first band.

26. The method as claimed in claim 25, wherein the monitoring includes monitoring the absence status of a second band in addition to the first band, and the supplying supplies at least one second pump light to the optical transmission medium on the basis of the absence status of the second band monitored, so that said at least one second pump light supplies additional power to longer wavelength channels related to the absence status of the second band.

27. The method as claimed in claim 25, wherein the monitoring monitors the absence status of a plurality of bands including said first band and the supplying supplies a plurality of pump lights including said at least one first pump unit to the optical transmission medium on the basis of the absence status of the plurality of bands monitored, so that the plurality of pump lights supply additional power to longer wavelength channels related to the absence status of the plurality of bands.

28. An optical transmission system comprising:

optical amplifier devices; and an optical transmission medium coupling the optical amplifier devices, one of the optical amplifier devices comprising:
  an amplifier stage coupled to the optical transmission medium,
  a monitor monitoring an absence status of a first band and
  a pump light source unit supplying at least one first pump light to the optical transmission medium on the basis of the absence status of the first band monitored, so that said at least one first pump light supplies additional power to longer wavelength channels related to the absence status of the first band.

29. A bi-directional optical transmission system in which a power transfer takes place from comparatively short wavelength signal to a comparatively long wavelength signal, the bi-directional optical transmission system comprising:
  optical amplifier devices; and
  an optical transmission medium coupling the optical amplifier devices, one of the optical amplifier devices comprising:
  first and second amplifier systems, and
  directional coupling elements coupling the first and, second amplifier stages to the optical transmission medium each of said first and second amplifier systems comprising:
    an amplifier stage coupled to the optical transmission medium,
    a monitor monitoring an absence status of a first band, and
    a pump light source unit supplying at least one first pump light to the optical transmission medium on the basis of the absence status of the first band monitored, so that said at least one first pump light supplies additional power to longer channels related to the absence status of the first band.

* * * * *

UNITED STATES PATENT AND TRADEMARK OFFICE
CERTIFICATE OF CORRECTION

PATENT NO. : 6,856,453 B2
DATED : February 15, 2005
INVENTOR(S) : Rainer Hainberger et al.

It is certified that error appears in the above-identified patent and that said Letters Patent is hereby corrected as shown below:

Column 19,
Line 37, change "sand" to -- and --.

Column 20,
Line 15, delete "a" second occurrence.

Signed and Sealed this

Twenty-third Day of August, 2005

JON W. DUDAS
*Director of the United States Patent and Trademark Office*